US011233288B2

(12) United States Patent
Collins et al.

(10) Patent No.: US 11,233,288 B2
(45) Date of Patent: Jan. 25, 2022

(54) SILICON SUBSTRATE CONTAINING INTEGRATED POROUS SILICON ELECTRODES FOR ENERGY STORAGE DEVICES

(71) Applicant: International Business Machines Corporation, Armonk, NY (US)

(72) Inventors: John Collins, Pleasantville, NY (US); Joel P. de Souza, Putam Valley, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 14 days.

(21) Appl. No.: 16/032,317

(22) Filed: Jul. 11, 2018

(65) Prior Publication Data

US 2020/0020895 A1 Jan. 16, 2020

(51) Int. Cl.
*H01M 4/04* (2006.01)
*H01M 4/38* (2006.01)
*H01M 50/116* (2021.01)

(52) U.S. Cl.
CPC ......... *H01M 50/116* (2021.01); *H01M 4/044* (2013.01); *H01M 4/386* (2013.01)

(58) Field of Classification Search
CPC .... H01M 2/0285; H01M 2/028; H01M 4/044; H01M 4/386; H01M 10/425; H01M 4/0428; H01M 4/134; H01M 4/1395; H01M 10/0436; H01M 10/0525; H01M 10/058; H01M 6/40; H01M 2220/30; H01L 23/58
USPC ........................................................ 429/176
See application file for complete search history.

(56) References Cited

U.S. PATENT DOCUMENTS

| 6,025,225 | A | * | 2/2000 | Forbes | ............. | H01L 27/10861 |
| | | | | | | 257/E21.012 |
| 6,197,450 | B1 | * | 3/2001 | Nathan | .................. | H01G 11/70 |
| | | | | | | 429/236 |
| 9,105,921 | B2 | | 8/2015 | Pushparaj et al. | | |
| 9,123,954 | B2 | | 9/2015 | Nathan | | |
| 9,142,833 | B2 | | 9/2015 | Tolbert et al. | | |

(Continued)

FOREIGN PATENT DOCUMENTS

WO 2016178571 A1 11/2016

OTHER PUBLICATIONS

Modutek Corporation, Using RCA Clean in a Wet Bench Process, p. 1-3, May 29, 2015 (Year: 2015).*

(Continued)

*Primary Examiner* — Christian Roldan
(74) *Attorney, Agent, or Firm* — Randall Bluestone; Ryan, Mason & Lewis, LLP

(57) ABSTRACT

A method of forming a semiconductor structure includes forming at least one trench in a non-porous silicon substrate, the at least one trench providing an energy storage device containment feature. The method also includes forming an electrical and ionic insulating layer disposed over a top surface of the non-porous silicon substrate. The method further includes forming, in at least a base of the at least one trench, a porous silicon layer of unitary construction with the non-porous silicon substrate. The porous silicon layer provides at least a portion of a first active electrode for an energy storage device disposed in the energy storage device containment feature.

20 Claims, 10 Drawing Sheets

(56) References Cited

U.S. PATENT DOCUMENTS

| | | | |
|---|---|---|---|
| 9,406,938 B2 | 8/2016 | King et al. | |
| 9,536,679 B2 | 1/2017 | Chiem | |
| 9,768,441 B2 | 9/2017 | Zaghib et al. | |
| 9,843,034 B2 | 12/2017 | Lee et al. | |
| 9,859,542 B2 | 1/2018 | Weis et al. | |
| 2004/0150072 A1* | 8/2004 | Schnitt | H01L 23/58 257/629 |
| 2010/0075181 A1* | 3/2010 | Niessen | H01M 10/00 429/9 |
| 2010/0225278 A1* | 9/2010 | Reefman | H01M 10/425 320/135 |
| 2010/0233539 A1* | 9/2010 | Green | H01M 10/052 429/218.1 |
| 2011/0111294 A1* | 5/2011 | Lopez | H01M 4/134 429/217 |
| 2012/0155507 A1* | 6/2012 | Srinivasan | H01M 2/348 374/45 |
| 2013/0078513 A1* | 3/2013 | Nathan | H01G 11/06 429/211 |
| 2013/0136996 A1 | 5/2013 | Lee et al. | |
| 2015/0004480 A1 | 1/2015 | Gardner et al. | |
| 2015/0280276 A1* | 10/2015 | Lemke | H01M 4/386 361/679.55 |
| 2016/0006016 A1 | 1/2016 | Porthault et al. | |
| 2017/0062834 A1 | 3/2017 | Unnikrishnan et al. | |
| 2017/0352883 A1* | 12/2017 | Cho | H01M 4/36 |

OTHER PUBLICATIONS

F. Ding et al., "Dendrite-Free Lithium Deposition via Self-Healing Electrostatic Shield Mechanism," Journal of American Chemical Society, Mar. 20, 2013, pp. 4450-4456, vol. 135, No. 11.

A.S. Westover et al., "On-Chip High Power Porous Silicon Lithium Ion Batteries with Stable Capacity Over 10,000 Cycles," Nanoscale, Jan. 7, 2015, pp. 98-103, vol. 7, No. 1.

S. Ferrari et al., "Latest Advances in the Manufacturing of 3D Rechargeable Lithium Microbatteries," Journal of Power Sources, Jul. 15, 2015, pp. 25-46, vol. 286.

Kenry et al., "Emerging Flexible and Wearable Physical Sensing Platforms for Healthcare and Biomedical Applications," Microsystems & Nanoengineering, Sep. 2016, 19 pages, vol. 2.

B. Warneke et al., "Smart Dust: Communicating with a Cubic-Millimeter Computer," Computer, Jan. 2001, pp. 44-51, vol. 34, No. 1.

J.W. Long et al., "Three-Dimensional Battery Architectures," Chemical Reviews, Aug. 19, 2004, pp. 4463-4492, vol. 104, No. 10.

H. Wu et al., "Designing Nanostructured Si Anodes for High Energy Lithium Ion Batteries," Nano Today, Oct. 2012, pp. 414-429, vol. 7, No. 5.

Asbjørn Ulvestad, "Porous Silicon as Anode Material for Li-Ion Batteries," Norwegian University of Science and Technology, Department of Materials Science and Engineering, Jun. 2013, 140 pages.

M. Nathan et al., "Three-Dimensional Thin-Film Li-Ion Microbatteries for Autonomous MEMS," Journal of Microelectromechanical Systems, Oct. 2005, pp. 879-885, vol. 14, No. 5.

A.A. Talin et al., "Fabrication, Testing and Simulation of All Solid State Three Dimensional Li-Ion Batteries," ACS Applied Materials & Interfaces, Nov. 30, 2016, pp. 32385-32391, vol. 8, No. 47.

Len Penzo, "Approximate Energy Costs of Your Home Appliances," http://lenpenzo.com/blog/id663-approximate-energy-costs-of-your-home-appliances.html, Aug. 2017, 4 pages.

Global Navigation Systems (GNS), "GPS Low Power Receiver GNS601uLP," http://www.gns-gmbh.com/index.php?id=281, Feb. 17, 2016, 22 pages, V 1.3.

D. Ruzmetov et al., "Electrolyte Stability Determines Scaling Limits for Solid-State 3D Li Ion Batteries," Nano Letters, Dec. 20, 2011, pp. 505-511, vol. 12, No. 1.

X. Han et al., "Negating Interfacial Impedance in Garnet-Based Solid-State Li Metal Batteries," Nature Materials, May 16, 2017, pp. 572-579, vol. 16, No. 5.

M.R. Lukatskaya et al., "Multidimensional Materials and Device Architectures for Future Hybrid Energy Storage," Nature Communications, Sep. 7, 2016, pp. 1-13, vol. 7.

M. Thunman et al., "Performance Investigation on Lithium-Ion Cells with Different Electrode Thicknesses for Application in Wafer-Integrated Microbatteries," The Electrochemical Society, 220th ECS Meeting, Abstract #1298, 2011, 1 page.

W.D. Richards et al., "Interface Stability in Solid-State Batteries," Chemistry of Materials, Dec. 7, 2015, pp. 266-273, vol. 28, No. 1.

K. Gerasopoulos et al., "Hierarchical Three-Dimensional Microbattery Electrodes Combining Bottom-Up Self-Assembly and Top-Down Micromachining," ACS Nano, Jun. 6, 2012, pp. 6422-6432, vol. 6, No. 7.

R. Hahn et al., "Silicon Integrated Micro Batteries Based on Deep Reactive Ion Etching and Through Silicon Via Technologies," IEEE 62nd Electronic Components and Technology Conference, May 29-Jun. 1, 2012, pp. 1571-1577.

J. Maeng et al., "Three-Dimensional Microcavity Array Electrodes for High-Capacitance All-Solid-State Flexible Microsupercapacitors," ACS Applied Matererials & Interfaces, May 13, 2016, pp. 13458-13465, vol. 8, No. 21.

A. Vlad et al., "Design Considerations for Unconventional Electrochemical Energy Storage Architectures," Advanced Energy Materials, Oct. 1, 2015, 53 pages, vol. 5, No. 19.

R. Hahn et al., "Development of Rechargeable Micro Batteries Based on Micro Channel Structures," IEEE International Conference on Green Computing and Communications, Nov. 20-23, 2012, pp. 619-623.

R. Hahn et al., "Integrated Lithium Micro Batteries for Highly Miniaturized Sensors," Energy Self-Sufficient Sensors; 7th GMM-Workshop, Feb. 24-25, 2014, 7 pages.

M. Noked et al., "Electrochemical Thin Layers in Nanostructures for Energy Storage," Accounts of Chemical Research, Oct. 18, 2016, pp. 2336-2346, vol. 49, No. 10.

John P. Collins, "Tuning Carbon Microstructure for Advancing Electrochemical Energy Storage," Graduate Doctoral Dissertations, Dec. 31, 2014, 271 pages.

B.J. Neudecker et al., "'Lithium-Free' Thin-Film Battery with In Situ Plated Li Anode," Journal of the Electrochemical Society, Feb. 1, 2000, pp. 517-523, vol. 147, No. 2.

R. Raj et al., "Current Limit Diagrams for Dendrite Formation in Solid-State Electrolytes for Li-Ion Batteries," Journal of Power Sources, Mar. 1, 2017, pp. 119-126, vol. 343.

P. Limthongkul et al., "Electrochemically-Driven Solid-State Amorphization in Lithium-Silicon Alloys and Implications for Lithium Storage," Acta Materialia, Feb. 25, 2003, pp. 1103-1113, vol. 51, No. 4.

U.S. Appl. No. 16/026,461, filed Jul. 3, 2018 and entitled "Porous Silicon/Li-metal Electrode Fabrication for Applications in Rechargeable Solid State Energy Storage."

U.S. Appl. No. 16/026,448, filed Jul. 3, 2018 and entitled "Kinetically Fast Charging High-Capacity Semiconductor Containing Energy Storage Device."

U.S. Appl. No. 16/026,426, filed Jul. 3, 2018 and entitled "Method of Making an Anode Structure Containing a Porous Region."

U.S. Appl. No. 16/026,473, filed Jul. 3, 2018 and entitled "Rechargeable Lithium ion Battery with a Porous Semiconductor Anode."

\* cited by examiner

300

400

1100

1200

SILICON SUBSTRATE CONTAINING INTEGRATED POROUS SILICON ELECTRODES FOR ENERGY STORAGE DEVICES

BACKGROUND

The present application relates to semiconductors, and more specifically, to techniques for forming semiconductor structures. Exponential growth in portable electronic devices has created significant interest in compact batteries or energy storage devices offering high energy densities. Lithium-ion batteries provide higher energy density compared with other rechargeable battery systems such as lead-acid, nickel-cadmium and nickel-metal hydride batteries. Lithium-ion batteries may use a variety of materials as an anode, including graphite, carbon nanotubes, germanium nanowires, along with various composites of these and other materials. Silicon exhibits higher capacity than conventional anode materials such as graphite, but suffers from problems associated with fabrication and recharge-ability.

SUMMARY

Embodiments of the invention provide techniques for forming in-silicon energy storage devices with integrated porous silicon electrodes.

In one embodiment, a method of forming a semiconductor structure comprises forming at least one trench in a non-porous silicon substrate, the at least one trench providing an energy storage device containment feature, forming an electrical and ionic insulating layer disposed over a top surface of the non-porous silicon substrate, and forming, in a base of the at least one trench, a porous silicon layer of unitary construction with the non-porous silicon substrate. The porous silicon layer provides at least a portion of a first active electrode for an energy storage device disposed in the energy storage device containment feature.

In another embodiment, a semiconductor structure comprises a non-porous silicon substrate having at least one trench disposed therein, the at least one trench providing an energy storage device containment feature, an electrical and ionic insulating layer disposed over a top surface of the non-porous silicon substrate, and a porous silicon layer of unitary construction with the non-porous silicon substrate disposed in a base of the at least one trench. The porous silicon layer provides at least a portion of a first active electrode for an energy storage device disposed in the energy storage device containment feature.

In another embodiment, an integrated circuit comprises an energy storage device comprising a non-porous silicon substrate having at least one trench disposed therein, the at least one trench providing an energy storage device containment feature for the energy storage device, an electrical and ionic insulating layer disposed over a top surface of the non-porous silicon substrate, a porous silicon layer of unitary construction with the non-porous silicon substrate disposed in a base of the at least one trench, wherein the porous silicon layer provides at least a portion of a first active electrode for the energy storage device disposed in the energy storage device containment feature, an electrolyte layer disposed over the porous silicon layer, and a second active electrode layer disposed over the electrolyte layer.

DETAILED DESCRIPTION

Figure 1:
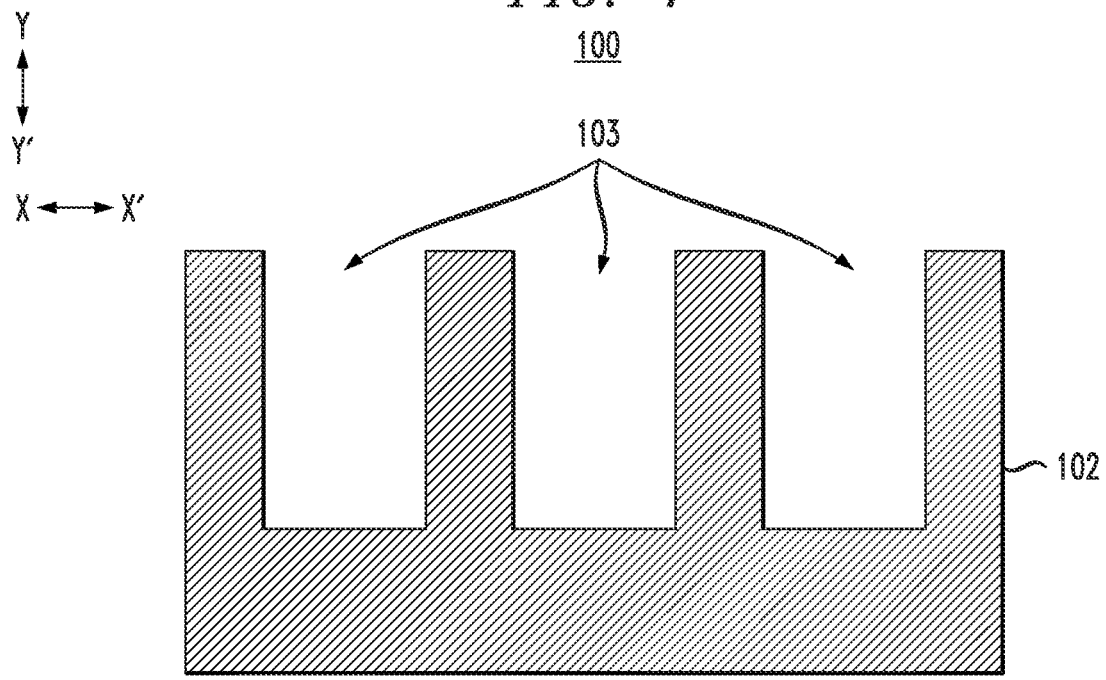
FIG. 1 depicts a side cross-sectional view of a semiconductor structure including a substrate with trenches formed therein, according to an embodiment of the invention.

Illustrative embodiments of the invention may be described herein in the context of illustrative methods for forming energy storage devices, along with illustrative apparatus, systems and devices formed using such methods. However, it is to be understood that embodiments of the invention are not limited to the illustrative methods, apparatus, systems and devices but instead are more broadly applicable to other suitable methods, apparatus, systems and devices.

The integration of batteries, or more generally energy storage devices, in microprocessor and memory chips is a significant requirement for Internet of Things (IoT) devices and other applications. IoT and other types of devices may require high energy and power density from miniaturized energy storage devices embedded in complementary metal-oxide-semiconductor (CMOS) circuits. It is anticipated that, over the next generation, required energy consumption for electronic devices will decrease as various human controlled and autonomous devices will become increasingly miniaturized. For example, power consumption for some IoT devices is expected to be lower than one Watt. Emerging applications requiring such on-board next generation energy storage devices include IoT devices, mobile devices, sensory equipment, and various autonomous environment, biological and social functioning machines. Smart dust and biomedical sensory and drug delivery devices are examples of such functional devices.

Due to lithium metal's extremely high theoretical energy density (e.g., 3860 milliampere hour per gram (mAh/g)), it is anticipated that solid-state energy storage devices will integrate lithium metal electrode material into the overall cell structure. Thus, processes are needed for utilizing silicon-based electrode material as a stable nucleation site for the in-situ formation of lithium metal electrodes. In addition, there is a need for a silicon-based energy storage housing unit which provides insulative protection from the external environment while also facilitating fabrication of an energy storage device via three-dimensional (3D) features and which enables ease-of-integration into the main body of circuit-based silicon containing systems. Further, there is a need for techniques for forming in-silicon energy storage devices which utilize integrated porous silicon-based material as an active lithium-hosting electrode surface.

Advantageously, some embodiments provide techniques for forming such in-silicon energy storage devices which utilize integrated porous silicon electrodes. Such integrated porous silicon electrodes include three-dimensionality within the pore structure of the porous silicon, thereby potentially increasing the porous silicon electrode's energy and power density capability. Such techniques provide various advantages for formation of microprocessors and memory chips, as well as for stand-alone conventional-sized energy storage devices (e.g., a wide range of consumer batteries and electronic device including batteries, such as coin cell batteries, power tools, smartphone batteries, grid storage batteries, electric vehicle batteries, etc.).

Some embodiments provide for encapsulated, hermetically-sealed energy storage device housing units containing integrated backside current collectors and which utilize porous silicon electrode material. Such energy storage device housing units may be used for forming solid state, liquid, and hybrid solid and liquid energy storage devices. Some embodiments provide methods for creating such energy storage device housing units, and for creating the integrated porous silicon electrodes for the energy storage devices. Techniques are further provided for in-situ energy storage device active layer deposition, processing and integration, including techniques for creating energy storage devices which integrate an energy storage device active layer inside an energy storage device housing unit. In some embodiments, the energy storage device active layer that is integrated inside the energy storage device housing unit includes a lithium metal/porous silicon active electrode. Techniques are further provided for in-situ lithiation of porous silicon electrode material embedded in an energy storage device housing unit.

In some embodiments, charge storage in an energy storage device is enabled through both an initial bonding of lithium material to silicon as well as through lithium to lithium alloy bonding, where the porous silicon acts as a suitable nucleation site for initial lithium to silicon bonding and then facilitates homogenous and relatively planarized formation of lithium metal through lithium to lithium alloying.

Conventional energy storage device housing units suffer from a number of significant drawbacks. For example, such conventional housing units do not currently possess or provide high-power density function or long energy delivery (e.g., high energy density) capabilities. Further, conventional housing units are not able to be integrated into single, small volume, low weight dimensions. Conventional housing units also typically utilize liquid electrolytes, which have inherent safety hazards, particularly the organic components of liquid electrolytes. Conventional housing units further lack durability and sustainable encapsulation and packaging (e.g., conventional housing units lack sufficient puncture resistance or degrade upon use, thus opening to the outside environment). Further, processing method limitations constrain the ability to fabricate energy storage device active layers (either independently or when integrated into an energy storage housing unit or device) in an in-situ fashion.

Conventional lithium metal electrode-based energy storage devices also have significant drawbacks. For example, conventional devices with lithium metal electrodes often suffer from incomplete or lack of lithium metal spatial control when device use is underway, suffer from an unsaturated lithium metal interface between electrolyte and electrode materials, and suffer from incomplete or lack of densely packed and/or layered lithium metal dendrite material, suitable electrochemically functioning charge density, and localization. Further, conventional devices often have ineffective electrode substrates or treated electrode surfaces and thus do not enable stable formation and localization of lithium metal adsorption and desorption, or lithium metal dendrite formation, growth and localization between an electrode substrate and solid electrolyte material. Ineffective electrode substrates or treated electrode surfaces also prevent the formation of suitable nucleation or lithium hosting sites, thereby limiting the performance of lithium or electrode material grown in-situ. Ineffective electrode substrates or treated electrode surfaces also lead to disadvantages in that they are unable to compensate for or prevent electrochemical cell degradation during volume change in electrode, electrolyte, lithium metal dendrite and plated or stripped materials throughout cell charge and discharge processes.

Thus, conventional solutions lack adequate energy storage device housing units that facilitate both the fabrication and integration of energy storage device active layers while also effectively encapsulating the energy storage device active layers from the potentially destructive external environment. Additionally, conventional energy storage device housing units do not provide adequate materials and solutions for stable and electrochemically effective lithium metal electrodes integrated within the energy storage device. Techniques are thus needed for separation of energy storage device housing units and encapsulating components with active electrode components which act as stable hosting sites for reversibly and rechargeable transient lithium metal. Some embodiments provide techniques for forming energy storage devices that are based on silicon substrates that act as both the energy storage device housing unit (e.g., for the containment of active components of the energy storage device) and provide porous silicon-based active electrode layers integrated together from a single stand-alone silicon raw material.

In some embodiments, energy storage device housing units are provided which enable fabricators to overcome the various limitations and drawbacks of conventional housing units described above. Such energy storage device housing units, when combined with the use of porous silicon as an integrated part of the energy storage device housing unit itself, provide further advantages in enabling electrochemically reversible lithium metal electrodes formed in-situ via electrochemical lithiation processes. Some embodiments further enable a hermetically sealed silicon-based energy storage device housing unit which facilitates the fabrication and integration of energy storage device active components, including lithium metal electrodes.

Energy storage device housing units in some embodiments enable a standardized energy storage device housing unit that is environmentally and electrically insulated, and which can be utilized for the deposition of wet, dry or a hybrid of wet and dry energy storage device active layers. Advantageously, this solves the problem of fabricating standardized energy storage device housing which contains front or top-side and back or bottom-side separated metal current collectors. Such top-side and bottom-side current collectors, possibly in combination with encapsulation layers, act as sealing components for the energy storage device itself. Such designs can be utilized for completely solid-state energy storage devices, liquid state energy storage devices, semi-solid energy storage devices, or any variable state of materials which can be utilized together to produce a working energy storage device.

Standardized and customized energy storage device housing units described herein are scalable for the housing and containment for desired working conductions of both thin (e.g, where individual layer cross-section thickness is less than 25 micrometers (μm)) and thick (e.g., where individual layer cross-section thickness is greater than 25 μm) active energy storage device components or layers. This may be achieved through customizing the dimensionality of the starting energy storage device housing substrate, as well as through customization of energy storage device containment features formed therein. Energy storage device containment features include trenches, channels, pores or free-space created areas in a substrate where energy storage device active components are to be formed. This solves the problem of enabling control of the dimensionality, thickness and therefore performance characteristics of the energy storage device (e.g., a completed front-side and back-side separated current collector containing energy storage device). Such performance characteristics include but are not limited to enabling accommodation of spatial changes which occur during charge and discharge of the energy storage device so as not to disrupt the overlap of interfaces between any two active components or layers of the energy storage device. Such accommodation may be enabled through manipulation of the 3D spatial features of energy storage device containment features formed during substrate processing (e.g., through manipulation of the length, width and depth of trenches formed in the starting substrate of the energy storage device housing unit).

Energy storage device housing units described herein further enable a standardized in-wafer design for the complete housing and sealing of active components or layers of an energy storage device, though combined crystalline silicon, porous silicon, p+ type and/or p− type silicon with back-side and front-side metal current collectors, enabling high surface area contact between outside current collectors and the internal energy storage device active layers. Advantageously, energy storage devices described herein have two independent, hermetically sealed current collectors in an opposing, non-overlapping special orientation that eliminates the possibility of short circuiting the energy storage device and also hermetically seals opposing ends of the active energy storage device while keeping the ionically mobile component of the energy storage device isolated within the silicon-based energy storage device housing unit.

The techniques described herein for creating energy storage device housing units further allow for scaling of the energy storage device based on the relative thickness of crystalline silicon, porous silicon, p+ type and/or p− type silicon that is used to implement the total cross section of the original silicon-based substrate forming the energy storage device housing unit. Increasing or decreasing the relative thickness of the porous silicon, for example, controls the relative magnitude of the lithium metal-hosting electrode thickness, as formed in-situ during electrochemical cycling. As a consequence, increasing or decreasing the relative thickness of crystalline silicon controls the relative thickness magnitude of the remaining active layers or components of the energy storage device (e.g., electrolyte layers, opposing active electrode layers, additives, opposing current collector, etc.).

In some embodiments, an energy storage device housing unit is fabricated utilizing a starting material such as crystalline silicon, porous silicon, p+ type and/or p− type silicon substrates or combinations thereof, which can be altered in their relative layers of porous silicon to tune the desired concentration or thickness of the lithium-hosting porous silicon electrode material. The relative concentration or thickness of the porous silicon and the other silicon type or types (e.g., crystalline or non-porous silicon, p+ type and/or p− type silicon, etc.) present in the substrate forming the energy storage device housing unit component is specifically tuned in order to adjust the spatial areas which do and do not take part as an electrode material in the lithium charge storage processes.

As will be described in further detail below, various embodiments may utilize patterned-type specific thicknesses of porous silicon in a non-porous silicon substrate, where the porous silicon acts as an electrode site for the reversible or rechargeable hosting of lithium metal charge storage. The respective patterned (e.g., isolated) type porous silicon embodiments are illustrated in the figures and described in further detail below. Techniques for forming blanket type porous silicon are disclosed in U.S. application Ser. No. 16/026,461, filed Jul. 3, 2018 and titled "Porous Silicon/Li-metal Electrode Fabrication for Applications in Rechargeable Solid State Energy Storage," U.S. application Ser. No. 16/026,448, filed Jul. 3, 2018 and titled "Kinetically Fast Charging High-Capacity Semiconductor Containing Energy Storage Device," U.S. application Ser. No. 16/026,426, filed Jul. 3, 2018 and titled "Method of Making an Anode Structure Containing a Porous Region," and U.S. application Ser. No. 16/026,473, filed Jul. 3, 2018 and titled "Rechargeable Lithium ion Battery with a Porous Semiconductor Anode", which are commonly assigned herewith and incorporate by reference herein.

FIG. 1 shows a side cross-sectional view 100 of a substrate 102 having trenches 103 formed therein. The substrate 102 is a non-porous silicon (Si)-based substrate. The substrate 102 may be a single-crystal non-porous Si substrate. The substrate 102 may have a vertical thickness (in direction Y-Y') ranging from 25 µm to 500 µm. The horizontal width (in direction X-X') of the substrate 102 may vary, such as based on a number of energy storage devices that are to be formed.

In some embodiments, 3D patterned porous silicon is formed from the substrate 102. This may involve: (i) creating a region of p+ doped silicon using boron (B) ion implantation coupled with annealing utilizing a temperature range of 600 degrees Celsius (° C.) to 1200 (° C.) for a duration in the range of less than one minute to 12 hours, followed by electrochemical anodization; (ii) epitaxial growth followed by electrochemical anodization; or (iii) electrochemical anodization or electrochemical etching, such as in hydrofluoric acid (HF) on patterned, partially electronically and ionically insulated silicon substrates. These processes enable formation of porous/non-porous silicon bilayers in a single substrate (e.g., in substrate 102) upon formation of 3D trench patterns 103. The trenches 103 may be formed utilizing etching, such as deep reactive-ion etching (D-RIE). More generally, any top-down method may be used to create the trenches 103 by etching or removing a desired amount of the non-porous silicon substrate 102. Each of the trenches 103 may have a horizontal width (in direction X-X') ranging from less than 5 µm to greater than 1 mm, and a vertical thickness or height (in direction Y-Y') ranging from less than 10 µm to greater than 400 µm, with the stipulation that the trench depth does not exceed approximately two-thirds of the thickness of the substrate 102. The trenches may be rectangular, circular, etc. as desired.

Figure 2:
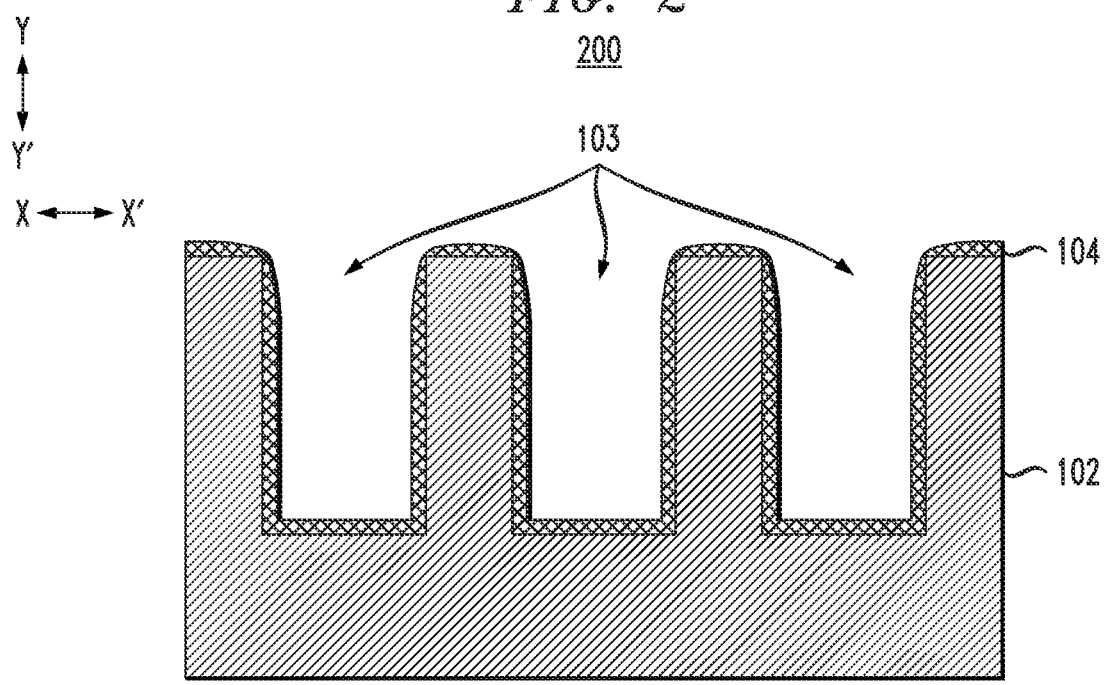
FIG. 2 depicts a side cross-sectional view of the FIG. 1 structure following formation of an electrical and ionic insulating spacer, according to an embodiment of the invention.

FIG. 2 shows a cross-sectional view 200 of the FIG. 1 structure, following formation of an electronic and ionic insulating spacer 104. The spacer 104 may be conformally deposited on the 3D patterned trenches 103 in substrate 102. Spacer 104 may be a single material (e.g. a material which is both electronic and ionic insulating), or multiple or layered materials (e.g., an electronic insulating material and an ionic insulating material). Examples of materials that are both electronic and ionic insulating suitable for use as spacer 104 include silicon nitride (SiN). For a spacer 104 formed of multiple layers or materials, the electronic insulating material may be SiN and the ionic insulating material may be aluminum oxide (AlO) or silicon dioxide ($SiO_2$).

It should be note that the spacer 104, regardless of whether it is formed of a single or multiple materials or layers as described above, should maintain a sufficient thickness to provide both electrical and ionic insulating properties after the energy storage device has been formed using the techniques described in further detail below. In other words, the spacer 104 should not lose too much thickness during the additional processing required for formation of the energy storage device (e.g., during the various etching steps or processes described below). Further, the material of spacer 104 should be resistant to etching in HF mediums.

The spacer 104 is deposited over the top of the FIG. 1 structure, using physical vapor deposition (PVD), atomic layer deposition (ALD), thermal oxide or any other suitable oxide deposition processing technique. The spacer 104, as shown in FIG. 2, covers the top surface of the substrate 102, and the sidewalls and bases of the trenches 103. The spacer 104 may have a uniform thickness, such as in the range of 50 nanometers (nm) to 400 nm.

Figure 3:
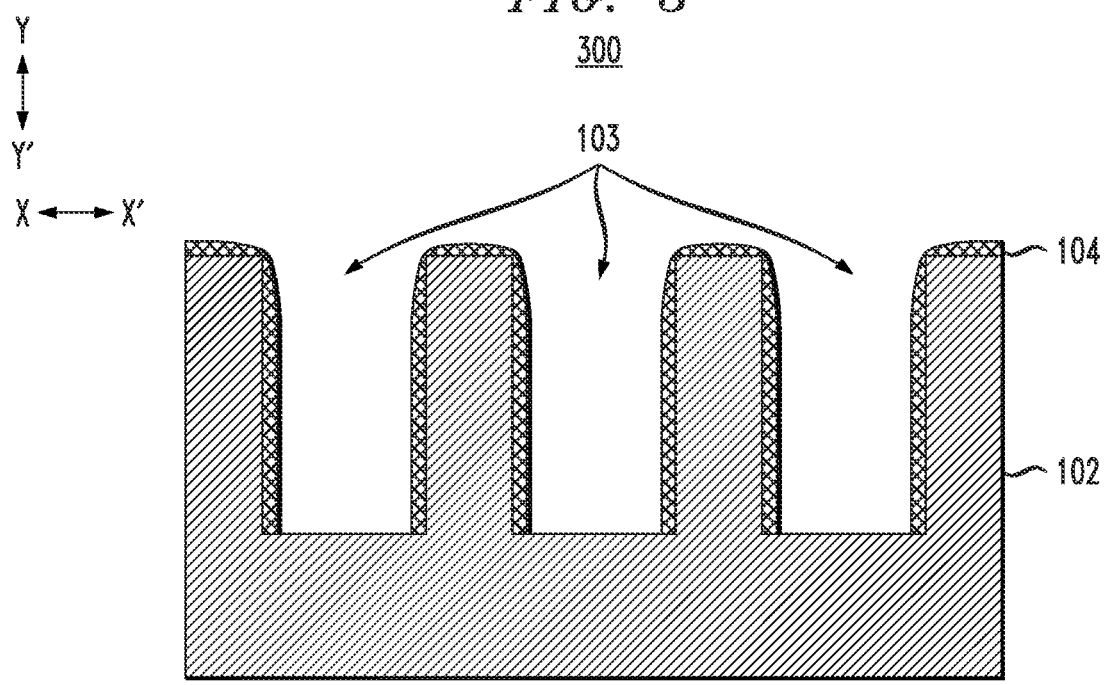
FIG. 3 depicts a side cross-sectional view of the FIG. 2 structure following etching of the spacer at the base of the trenches, according to an embodiment of the invention.

FIG. 3 shows a side cross-sectional view 300 of the FIG. 2 structure following removal of portions of the spacer 104 at the base of the trenches 103. The spacer 104 at the base of the trenches 103 may be removed using etching, such as reactive-ion etching (ME). Removal of the spacer 104 from the base of the trenches 103 enables an electrical, as well as potentially ionic, connection between the backside of the substrate 102 and active battery material that is later filled in the trenches 103. A resist or masking layer may be patterned on the top surface of the substrate and sidewalls of the trenches 103 to protect the spacer 104 formed thereon during removal of the spacer 104 from the base of the trenches 103. For example, hard masks (e.g., steel, Mylar, etc.) or soft masks (e.g., photoresist materials) can be utilized to protect the top of the substrate 102 and sidewalls of the trenches 103 during removal of the spacer 104 from the base of the trenches 103.

Various techniques will now be described for forming patterned or isolated porous silicon in the non-porous silicon substrate 102. In some embodiments, the non-porous silicon substrate is a p– type silicon material. The use of an electrical and ionic insulating layer or layers (e.g., spacer 104) may act as both a protectant of the original non-porous silicon substrate material (e.g., during HF or RIE etching processes) and as an electrical and ionic insulator for advancing the performance of completed energy storage devices. The electrical and ionic insulating materials, as mentioned above, are referred to collectively as spacer 104 (also as dielectric spacer 104), as they have both charge-particle insulating properties and function as a "spacing" material between deposited energy storage device components and the original silicon substrate material. Formation of the dielectric spacer 104 is advantageous for controlling where porous silicon is formed during the processing described below.

Figure 4:
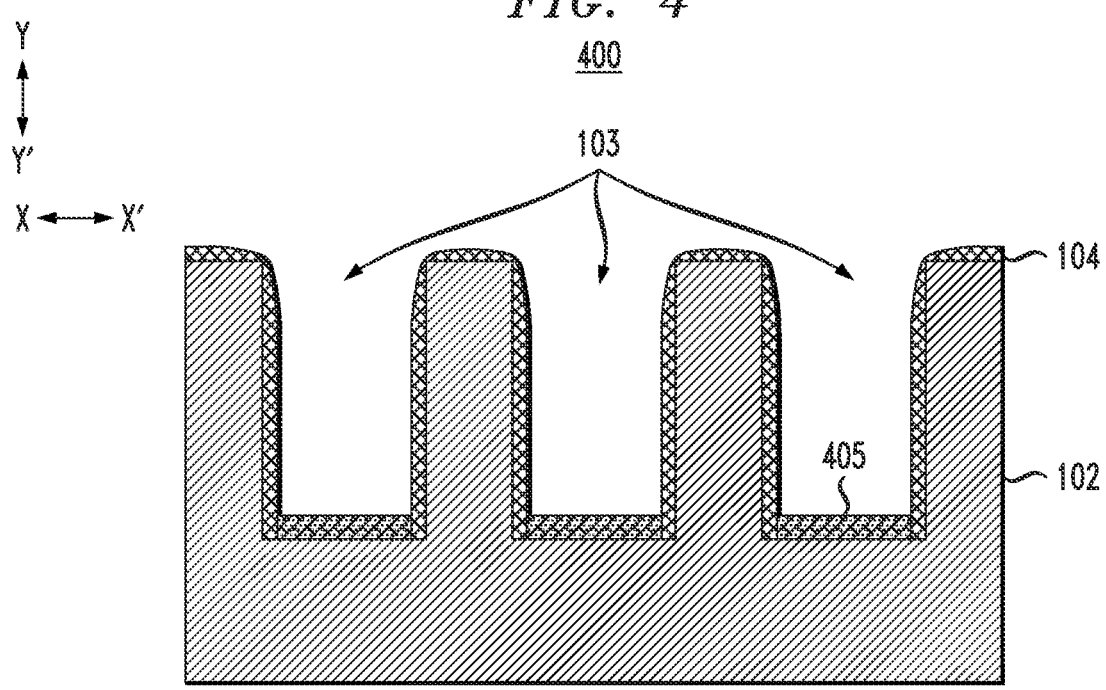
FIG. 4 depicts a side cross-sectional view of the FIG. 3 structure following selective growth of an epitaxial layer at the exposed base of the trenches, according to an embodiment of the invention.

FIG. 4 shows a side cross-sectional view 400 of the FIG. 3 structure. In the FIG. 4 embodiment, the substrate 102 is assumed to comprise a p– type non-porous silicon material, with trenches 103 formed therein and a dielectric spacer 104 (e.g., formed of SiN) formed on the top of the substrate 102 and sidewalls of the trenches 103 as described above. FIG. 4 shows the FIG. 3 structure following formation of epitaxial layers 405 at the exposed bases of the trenches 103 in the non-porous silicon substrate 102. In some embodiments, p+ type silicon (e.g., with a Boron doping in the range of $10^{18}/cm^3$ to greater than $10^{20}/cm^3$, with a preferred doping of 1 to $3^{19}/cm^3$) is formed via selective epitaxial deposition at the exposed bases of the trenches 103 in the non-porous, p– silicon substrate 102. In other embodiments, the epitaxial layers 405 may be formed via a selective epitaxial growth process. Some embodiments may further combine selective epitaxial growth and ion implantation processes to form the epitaxial layers 405. The epitaxial layers 405 may be p+ epitaxial layers, such as boron doped silicon. The epitaxial layers 405 may have a vertical thickness (in direction Y-Y') which ranges as desired, such as from 0.1 μm to 20 μm, preferably in the range of 2 μm to 3 μm. More generally, the epitaxial layers 405 are formed with a thickness that is much thinner than the thickness of the trenches 103 that they reside in. As described elsewhere herein, the size of the trenches 103 may vary to accommodate a desired thickness for resulting porous silicon layers while leaving sufficient room for formation of components of the energy storage devices.

Figure 5:
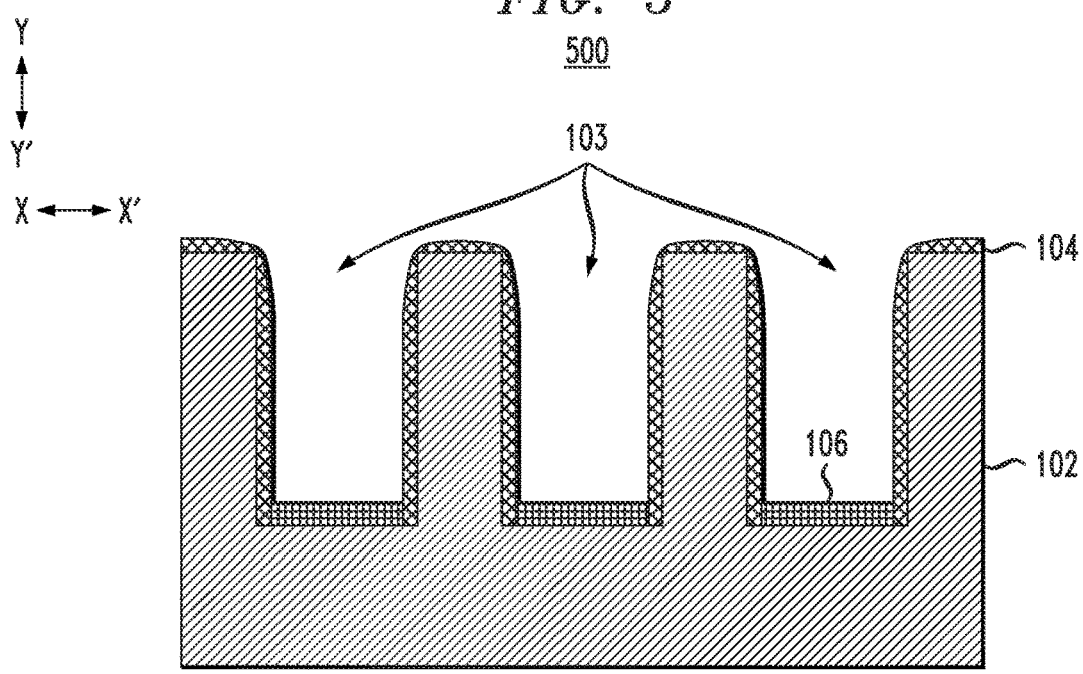
FIG. 5 depicts a side cross-sectional view of the FIG. 4 structure following formation of porous silicon from the epitaxial layer, according to an embodiment of the invention.

FIG. 5 shows a side cross-sectional view 500 of the FIG. 4 structure following formation of porous silicon layers 106 from the epitaxial layers 405. The porous silicon layers 106 may be formed via anodic etching, such as using an HF-based anodization etching treatment. The anodization treatment may include etching in a solution of 49% HF for a specific period of time (e.g., 10 seconds (s) to 20 minutes (min), with a preferred time of less than 500 s) at a specific current density normalized to the surface area of the trench base (e.g., less than 1 to greater than 10 milliamperes per square centimeter (mA/cm$^2$)). The anodization treatment may further utilize surface cleaning treatments (e.g., RCA cleaning treatments such as: ammonium hydroxide (NH$_4$OH):hydrogen peroxide (H$_2$O$_2$):deionized (DI) water in a 1:1:5 ratio at nominally 80° C.).

The porous silicon structure induced via electrochemical anodization in concentrated HF enables a volume-expansion compensating, Lithium charge storage capability in/on Silicon rich material, mechanical electrode-failure suppressing, high capacity, and high limiting diffusion coefficient porous silicon electrode material. Advantageously, porous silicon electrodes formed utilizing the silicon-wafer/porous silicon unitary construction described herein do not require deposition of additional materials (e.g., structural-enhancing material, conductive agents, stabilizing agents) for the pore structure lifetime during electrochemical cycling. The methods herein describe the highly advantageous attribute of unity between the fabricated porous silicon and the crystalline silicon substrate or wafer from which it was created, while enabling the additional advantage of three dimensional patterning of porous silicon on the original crystalline silicon substrate from which the porous silicon emerges. In addition, porous silicon electrodes can be fabricated in a specified thickness or cross-section of the p+ doped silicon, enabling porous silicon to be physically, chemically, and mechanically unified with a non-porous silicon substrate (e.g., a pure silicon bulk substrate). In some embodiments, the porosity of the bulk porous silicon electrode layer maintains less than 30% total internal porosity.

Figure 6:
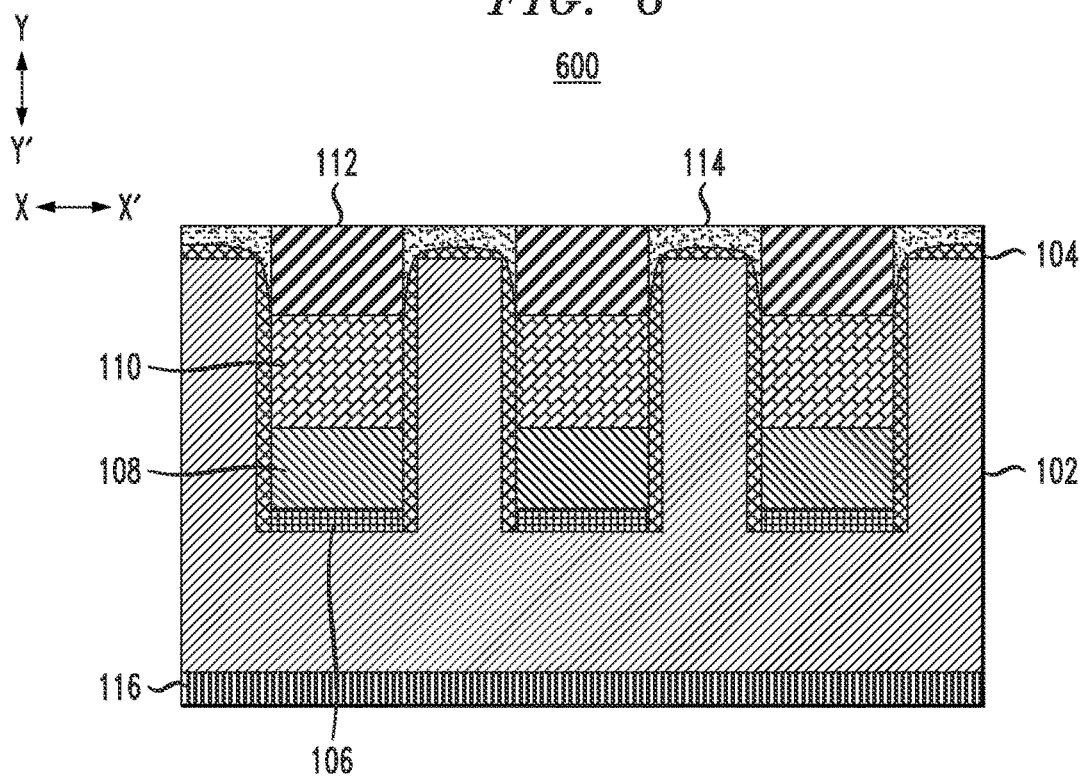
FIG. 6 depicts a side cross-sectional view of the FIG. 5 structure following formation of electrolyte, active cathode electrode, top-side current collector, top-side encapsulation, and bottom-side current collector layers, according to an embodiment of the invention.

FIG. 6 depicts a side cross-sectional view 600 of the FIG. 5 structure following formation of additional layers for the energy storage device, including an electrolyte layer 108, an active electrode or cathode layer 110, a top-side current collector or metal contact 112, encapsulation layer 114, and a bottom-side current collector or metal contact 116

The electrolyte layer 108 may be formed of a liquid, solid or semi-solid material such that it is ionically conducting to lithium yet also maintains a very low conduction with respect to electrons, and which requires or does not require an additionally electrically separating material (a separator such as polyacrylonitrile (PAN)). The electrolyte layer 108 may be formed of, for example, a solid electrolyte such as lithium phosphorus oxynitride (LiPON), although other suitable materials such as dilithium sulfide (Li$_2$S), lithium phosphorus sulfide (Li$_3$PS$_4$), lithium germanium phosphorus sulfide (Li$_{10}$GeP$_2$S$_{12}$), lithium tin sulfide (Li$_4$SnS$_4$), lithium phosphorus sulfide chloride (Li$_6$PS$_4$Cl), lithium titanate oxide (Li$_4$T$_{15}$O$_{12}$), lithium zirconium oxide (Li$_2$ZrO$_3$), lithium lanthanum zirconium oxide (Li$_7$LaZr$_2$O$_{12}$), lithium germanium oxide (Li$_4$GeO$_4$), lithium niobate (LiNbO$_3$), lithium germanium phosphate (LiGe$_2$(PO$_4$)$_3$), lithium titanium phosphate (LiTi$_2$(PO$_4$)$_3$), lithium oxide chloride (Li$_3$OCl), lithium bromide (LiBr), lithium magnesium bromide (Li$_2$MgBr$_4$), lithium aluminum bromide (LiAlBr$_4$), lithium zirconium bromide (Li$_2$ZnBr$_4$), lithium manganese bromide (Li$_2$MnBr$_4$), lithium chloride (LiCl), lithium magnesium chloride (Li$_2$MgCl$_4$), lithium zirconium chloride (Li$_2$ZnCl$_4$), lithium aluminum chloride (LiAlCl$_4$), lithium cadmium chloride (Li$_3$CdCl), lithium fluoride (LiF), lithium yttrium fluoride (LiYF$_4$), lithium aluminum fluoride (Li$_3$AlF$_6$), lithium argon fluoride (Li$_2$ArF$_6$), sodium (Na) super ionic conductor (NASICON)-type electrolyte such as Na$_{1+x}$Zr$_2$Si$_x$P$_{3-x}$O$_{12}$, lithium aluminum titanium phosphate (LiAlTi(PO$_4$)$_3$) (LATP), lithium aluminum germanium phosphate (LiAlGe(PO$_4$)$_3$) (LAGP), lithium lanthanum argon oxide (Li$_7$La$_3$Ar$_2$O$_{12}$) (LLZO), lithium super ionic conductor (thio-LISICON) electrolytes such as Li$_{2+2x}$Zn$_{1-x}$GeO$_4$, lithium germanium phosphorus sulfide (Li$_{3.25}$Ge$_{0.25}$P$_{0.75}$S$_4$), lithium phosphorus sulfur chloride (Li$_6$PSCl), lithium phosphorus sulfur bromide (Li$_6$PSBr), lithium phosphorus sulfur iodine (Li$_6$PSI), lithium germanium phosphorus sulfide (Li$_{10}$GeP$_2$S$_{12}$), lithium sulfide-phosphorus sulfide (Li$_2$S—P$_2$S$_4$), lithium phosphorus sulfide (Li$_7$P$_3$S$_{11}$), lithium lanthanum argon niobium oxide (Li$_{6.75}$La$_3$Ar$_{1.75}$Nb$_{0.25}$O$_{12}$, gel polymers, ceramics, a Sol-Gel combination, lithium aluminum titanium phosphate (Li$_{1.3}$Al$_{0.3}$Ti$_{1.7}$(PO$_4$)$_3$) or more generally any LiAlTi(PO$_4$), any combination of varying Li$_2$S to P$_2$S$_4$ percent combinations, lithium nitride (Li$_3$N), lithium boron nitride (Li$_3$BN$_2$), lithium nitride chloride (Li$_4$NCl), lithium hydride (LiH), lithium boron hydride (LiBH$_4$), lithium barium hypochlorite (Li$_x$Ba$_y$O$_{1+z}$Cl$_{1-2z}$) or any other feasible electrolyte which performs the function of electrolyte active layers in a stable or semi-stable (e.g., low interfacial resistance) fashion when utilized in energy storage devices may be used.

The electrolyte layer 108 may be deposited using PVD, chemical vapor deposition (CVD), hot pressing (e.g., thermally controlled mechanical pressurization), hot pressing under vacuum conditions (e.g., thermally controlled pressurization in controlled vacuum conditions), slurry-based mechanical, sol-gel type or in-situ formation of the interfacial layer through electrochemical deposition processing, etc. The electrolyte layer 108 may have a vertical thickness (in direction Y-Y') ranging from 20 nm to greater than 10 μm.

The active electrode 110 may form the cathode of the resulting energy storage device. The active electrode 110 may be formed of lithium cobalt oxide (LiCoO$_2$) (LCO) or another suitable material such as lithium manganese oxide (LiMn$_2$O$_4$), lithium nickel manganese cobalt oxide (LiNiMnCoO$_2$) (NMC), lithium manganese nickel oxide (LiMn$_{1.5}$Ni$_{0.5}$O$_4$), lithium iron phosphate (LiFePO$_4$), lithium iron manganese phosphate (LiFeMnPO$_4$), lithium nickel cobalt aluminum oxide (LiNiCoAlO$_2$), vanadium pentoxide (V$_2$O$_5$), vanadium pentoxide-lithium metaborate (V$_2$O$_5$—LiBO$_2$), lithium titanium oxide (Li$_4$Ti$_5$O$_{12}$), lithium iron phosphate-lithium vanadium phosphate (LiFePO$_4$—Li$_3$V$_2$(PO$_4$)$_3$), lithium vanadium phosphate-lithium vanadium fluorophosphates (Li$_3$V$_2$(PO$_4$)$_3$—LiVPO$_4$F), lithium vanadium phosphate-lithium vanadyl phosphate (Li$_3$V$_2$(PO$_4$)$_3$—LiVOPO$_4$), lithium cobalt oxide-lithium manganese oxide (LiCoO$_2$—LiMn$_2$O), lithium iron phosphate-lithium cobalt oxide (LiFePO$_4$—LiCoO$_2$), lithium iron phosphate-lithium manganese oxide (LiFePO$_4$—LiMn$_2$O$_4$), lithium iron phosphate-lithium vanadium fluorophosphates (LiFePO$_4$—LiVPO$_4$F), lithium iron phosphate-lithium manganese phosphate (LiFePO$_4$—LiMnPO$_4$), lithium vanadium phosphate-lithium manganese phosphate (Li$_3$V$_2$(PO$_4$)$_3$—LiMnPO$_4$), etc.

The active electrode layer 110 may be deposited using PVD, CVD, hot pressing (e.g., thermally controlled mechanical pressurization), hot pressing with under vacuum conditions (e.g., thermally controlled pressurization in controlled vacuum conditions), slurry-based mechanical, sol-gel type or in-situ formation of the interfacial layer through electrochemical deposition processing. The active electrode layer 110 may have a vertical thickness (in direction Y-Y') ranging from less than 300 nm to greater than 100 μm.

The top-side current collector 112 may be formed of copper (Cu) or another suitable material such as nickel (Ni), aluminum (Al), titanium (Ti), tungsten (W), platinum (Pt), gold (Au), a suitable composite material such as nickel-copper composite materials, etc. The top-side current collector 112 may be deposited using PVD, ALD, evaporation, mechanical, thermo-mechanical processing, etc. The top-side current collector 112 may have a horizontal width (in direction X-X') which matches that of the underlying active electrode layer 110 (as shown), or has a smaller or larger surface area than that of the underlying electrode and a vertical thickness (in direction Y-Y') which does not impede its mechanical robustness, adhesion properties or conductive properties under electrochemical conditions, such as ranging from less than 500 nm to greater than 50 μm, depending on the nature of the current collector and the desired performance properties.

The encapsulation layer 114 is formed over the top surface of the spacer 104 surrounding the top-side current collector 112. Suitable materials that may be used for encapsulation layer 114 include silicon nitride, polymer materials, metal-based materials, composite materials (such as SiO$_2$ layer followed by Si$_3$N$_4$, or Si$_3$N$_4$ layer followed by a layer of aluminum-based material followed by polymer based material (e.g., parylene) where several iterations of this 3-fold layering can occur, etc.). The vertical thickness (in direction Y-Y') of the encapsulation layer 114 may be such that a top surface thereof is coplanar with a top surface of the top-side current collector 112, such as a vertical thickness in the range of less than 500 nm to greater than 1 μm.

Figure 9:
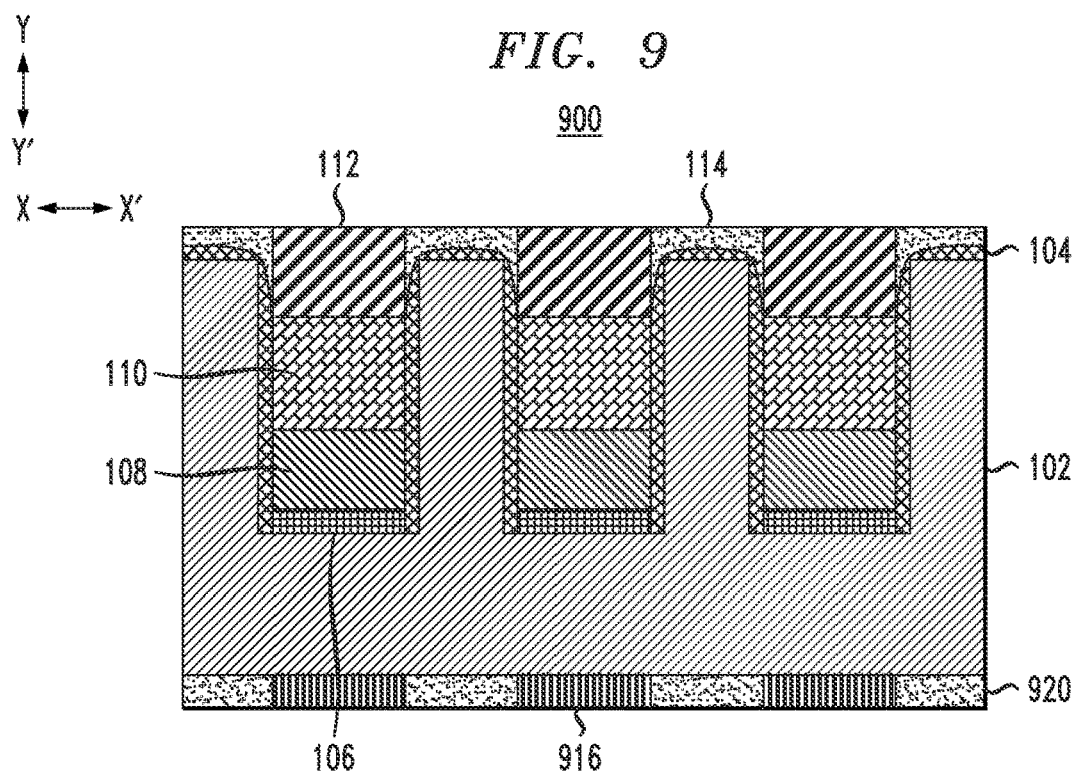
FIG. 9 depicts a side cross-sectional view of the FIG. 5 structure following formation of electrolyte, active cathode electrode, top-side current collector, top-side encapsulation, bottom-side current collector, and bottom-side encapsulation layers, according to an embodiment of the invention.

The bottom-side current collector 116 may be formed of aluminum (Al) or another suitable material such as nickel (Ni), titanium (Ti), tungsten (W), copper (Cu), platinum (Pt), gold (Au), or a suitable composite material. The bottom-side current collector 116 may be deposited using PVD, ALD, evaporation, mechanical, thermo-mechanical processing, etc. The bottom-side current collector 116 may have a horizontal width (in direction X-X') which matches that of the width of the trenches 103 (as shown in FIG. 9 described below), or has a smaller or larger surface area (as shown in FIG. 6) than that of the active energy storage device materials residing above it and a vertical thickness (in direction Y-Y') which does not impeded its mechanical robustness, adhesion properties or conductive properties under electrochemical conditions, such ranging from less than 100 nm to greater than 5 μm, depending on the nature of the current collector and the desired performance properties.

It should be appreciated that in some embodiments, formation of the bottom-side current collector 116 may take place earlier than the processing and fabrication steps described above with respect to one or more of FIGS. 1-6.

Although not shown in FIG. 6, interfacial layers may be formed between the electrolyte layer 108 and the active electrodes (e.g., porous silicon 106 acting as the anode and electrode layer 110 acting as the cathode). An example of such a structure will be described in further detail below with respect to FIG. 10.

Figure 7:
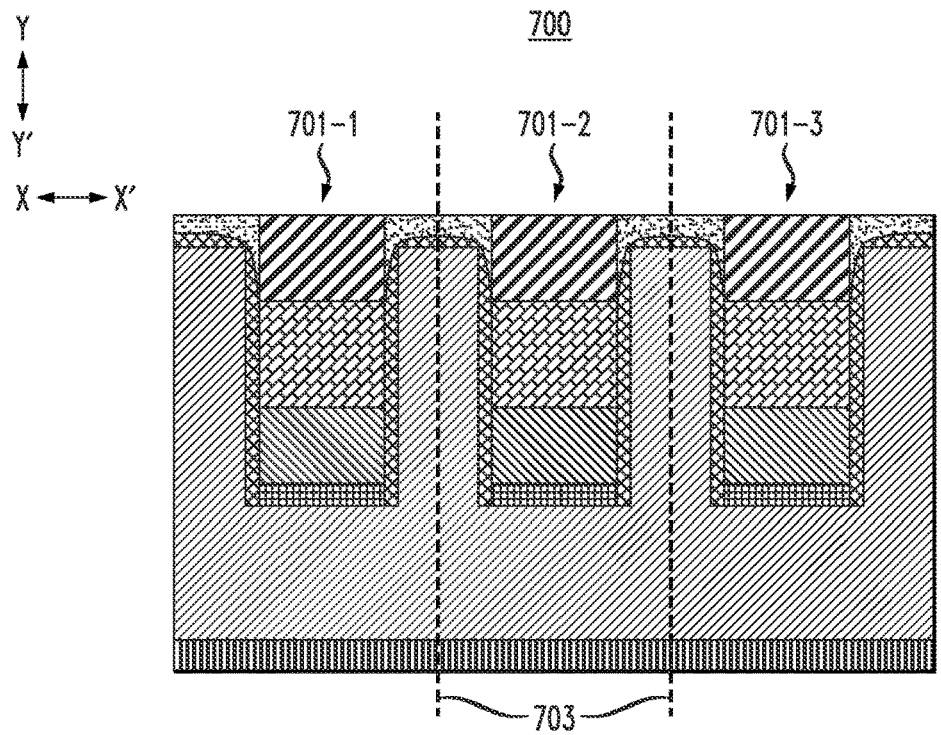
FIG. 7 depicts a side cross-sectional view of the FIG. 6 structure depicting separation to form independent energy storage devices, according to an embodiment of the invention.

FIG. 7 shows a side cross-sectional view 700 of the FIG. 6 structure, with the addition of cleaving or dicing lines 703 which illustrate the process by which the separation of independent energy storage devices 701-1, 701-2, 701-3 can occur. Dicing or cleaving of the devices 701-1, 701-2, 701-3 can utilize various processes, including but not limited to saw cutting (e.g., with a diamond saw or other suitable tool), cleaving (e.g., through the single crystalline silicon substrate 102), laser cutting, etc. Although FIG. 7 depicts separation of the FIG. 6 structure into three independent energy storage devices, it should be appreciated that embodiments are not so limited. In other embodiments, two or more energy storage devices may be kept together during separation from a remainder of the structure.

Figure 8:
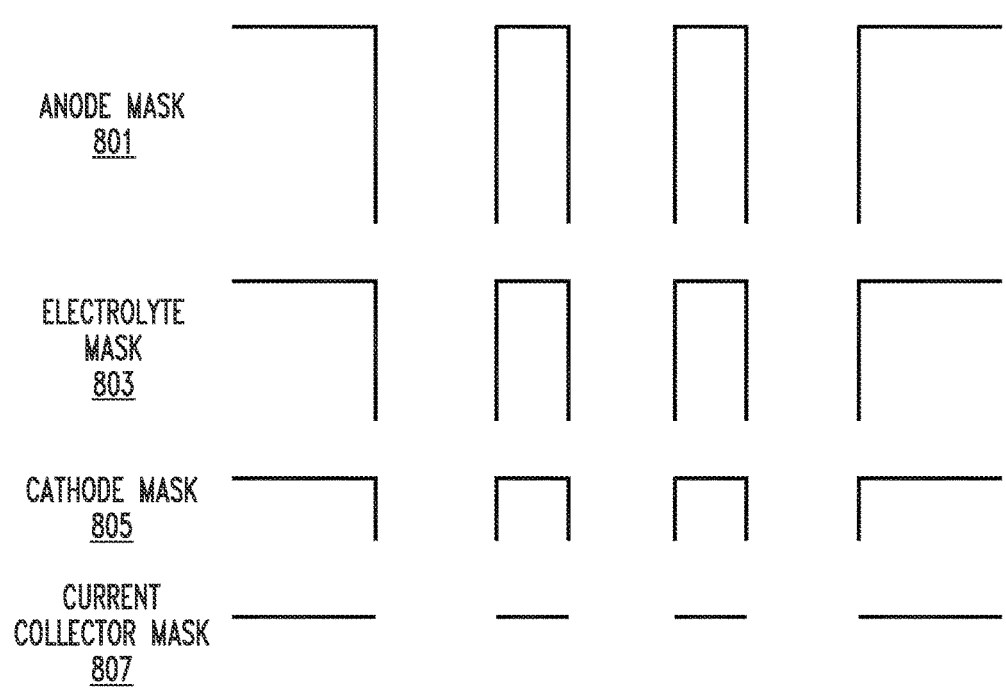
FIG. 8 depicts mask features that may be used to form the FIG. 6 structure, according to an embodiment of the invention.

FIG. 8 shows examples of "lock-and-key" style independent masks, also referred to as shadow masks, that are designed to fit in the trenches 103 (e.g., energy storage device containment features) to facilitate formation of the active components of the energy storage device. The shadow masks may be "hard" masks (e.g., formed of a metal such as steel, stainless steel, polymer coated stainless steel, silicon, etc.) that may be physically deposited and lifted from the structure, or "soft" masks (e.g., formed of a resist material such as photopolymeric, photodecomposing, photocross-linking photoresist, hydrocarbon/organic composition based resist materials, etc.) that may be deposited and removed chemically. The depth that each shadow mask reaches into the energy storage device containment features (e.g., trenches 103) is based on how much "fill" of each component of the energy storage device is desired to be deposited into the energy storage device containment features. As each layer fills the trenches 103, the depth of the shadow masks decreases. The shadow masks protect and prevent undesired or uncontrolled formation of the various energy storage device components on sidewalls of the trenches 103 during wet (e.g., slurry, etc.), dry (e.g., atomic layer deposition (ALD) or sputtering, etc.) and hybrid methods of deposition of such components.

As shown, FIG. 8 includes an anode mask 801 used for formation of the anode or active electrode layer (e.g., porous silicon layer 106 in the FIG. 6 structure), an electrolyte mask 803 used for formation of the electrolyte layer (e.g., electrolyte layer 108 in the FIG. 6 structure), a cathode mask 805 used for formation of the cathode (e.g., active electrode layer 110 in the FIG. 6 structure), and a current collector mask 807 used for formation of the top-side current collector (e.g., top-side current collector 112 in the FIG. 6 structure). For structures which include additional layers (e.g., the structure of FIG. 10 described below which includes interfacial layers), additional masks may be utilized. No mask is need for formation of encapsulation layers 114 or bottom-side current collector 116 in the example processing described above. In other embodiments with differently sized energy storage device containment features of energy storage device housing units, a shadow mask may be used for formation of encapsulation layers and/or bottom-side current collectors (e.g., such as for the structure of FIG. 9 described below).

FIG. 9 shows a side cross-sectional view of the FIG. 6 structure, but with patterned or isolated bottom-side current collectors 916 that are aligned with the energy storage device containment features (e.g., trenches 103). The bottom-side current collectors 916 may be formed of similar materials and with similar processing as that described above with respect to bottom-side current collector 116. An encapsulation layer 920 is formed surrounding the bottom-side current collectors 916. The encapsulation layer 920 may be formed of similar materials and with similar processing as that described above with respect to encapsulation layer 114.

Figure 10:
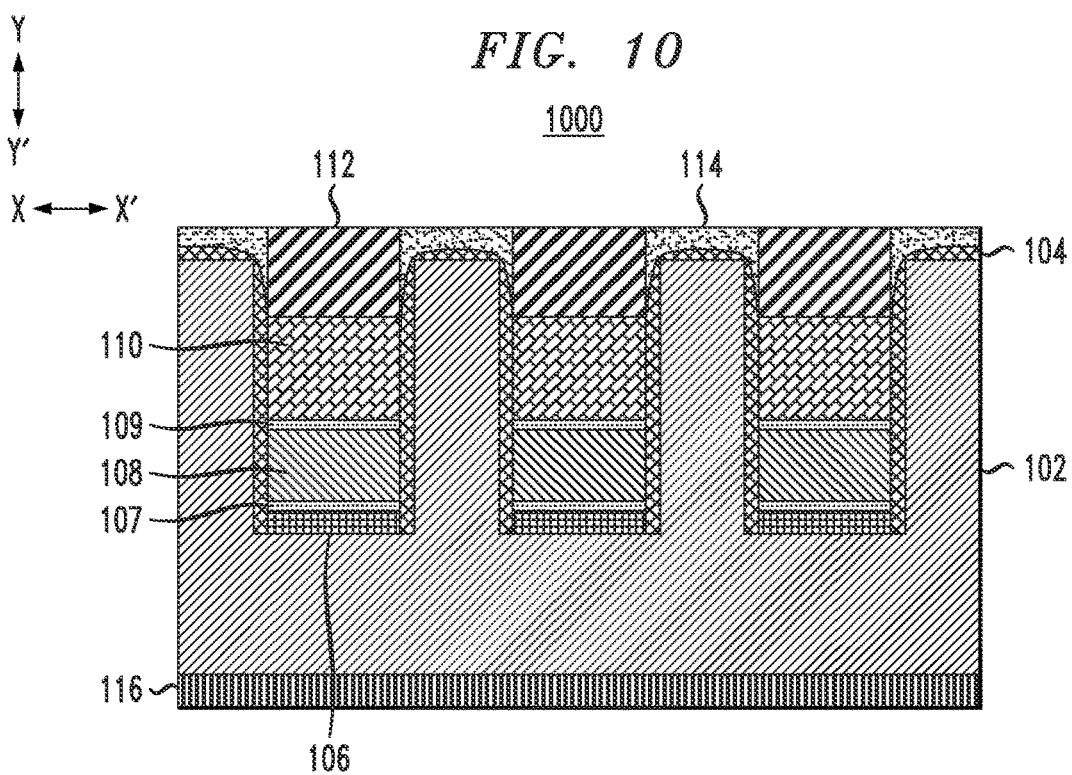
FIG. 10 depicts a side cross-sectional view of the FIG. 5 structure following formation of first interfacial, electrolyte, second interfacial, active cathode electrode, top-side current collector, top-side encapsulation, and bottom-side current collector layers, according to an embodiment of the invention.

FIG. 10 shows a side cross-sectional view of the FIG. 6 structure, but with interfacial layers formed at the interface between the electrolyte 108 and the anode and cathode (e.g., active electrodes). The anode-electrolyte interfacial layer 107 formed at the anode (e.g., porous silicon 106)-electrolyte (e.g., electrolyte 108) interface may be formed of lithium metal, molten lithium metal, or another suitable material such as a lithiated active planar anode layer. The anode-electrolyte interfacial layer 107 may be deposited using evaporation type, PVD and/or in-situ electrochemical deposition or plating-type processing. The anode-electrolyte interfacial layer 107 may have a vertical thickness (in direction Y-Y') ranging from less than 10 nm to greater than 1 μm.

The cathode-electrolyte interfacial layer 109 formed at the electrolyte (e.g., electrolyte 108)-cathode (e.g., active electrode layer 110) interface may be formed of lithium phosphorus oxygen (LiPO), aluminum oxide ($Al_2O_3$), lithium niobium oxide (LiNbO) or another suitable material such as gold (Au), indium (In), lithium silicon composites or any other such material which can be conformally deposited on the electrolyte and/or cathode and successfully facilitate the adhesion between the cathode (e.g., active electrode 110) and electrolyte (e.g., electrolyte layer 108) (such as plasticizing and/or ceramic-seeded, Li-conducting interposer materials) while also maintaining high Li-ion conductivity. The cathode-electrolyte interfacial layer 109 may be deposited using PVD, CVD, hot pressing (e.g., thermally controlled mechanical pressurization), hot pressing with under vacuum conditions (e.g., thermally controlled pressurization in controlled vacuum conditions), or in-situ formation through electrochemical deposition processing. The cathode-electrolyte interfacial layer 109 may have a vertical thickness (in direction Y-Y') ranging from 5 nm to greater than 15 nm.

Figure 11:
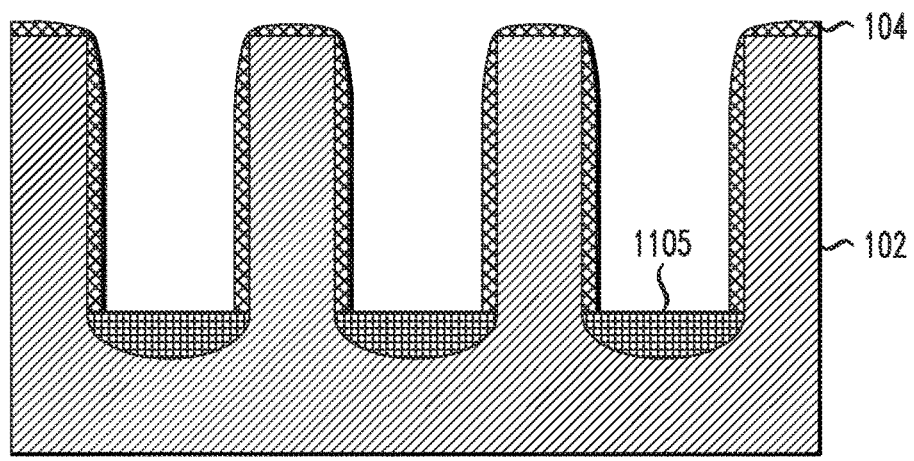
FIG. 11 depicts a side cross-sectional view of the FIG. 2 structure following implantation of ions at the base of the trenches, according to an embodiment of the invention.

FIG. 11 shows a side cross-sectional view 1100 of the FIG. 3 structure, where the substrate 102 is a p− type nonporous silicon material and a doped region 1105 of p+ type silicon material is formed at the bases of the trenches 103 via Boron ion implantation (e.g., with a Boron doping range of $10^{18}/cm^3$ to greater than $10^{20}/cm^3$, with a preferred doping of 1 to $3^{19}/cm^3$). The projected range of Boron implantation into the base of the trenches is less then 1 μm in some embodiments.

Figure 12:
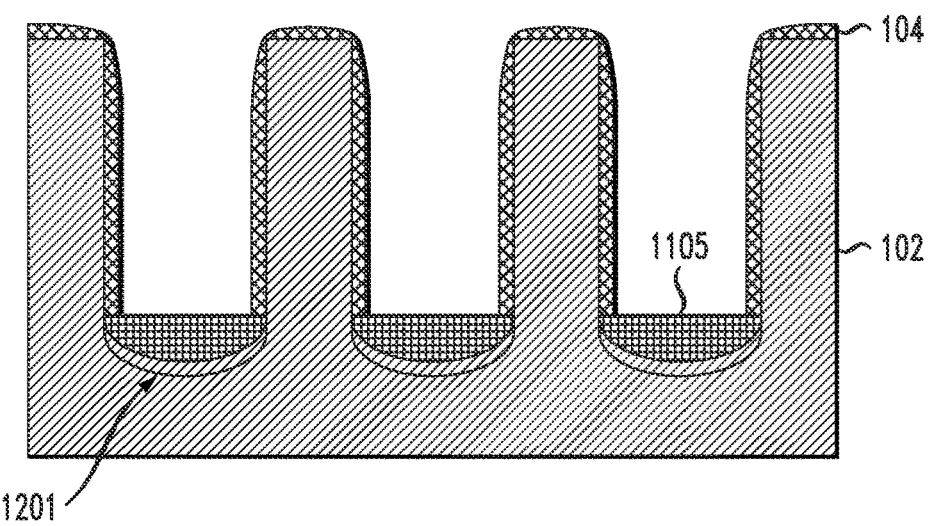
FIG. 12 depicts a side cross-sectional view of the FIG. 11 structure following re-distribution of the implanted ions through annealing to form doped regions, according to an embodiment of the invention.

FIG. 12 shows a side cross-sectional view 1200 of the FIG. 11 structure following annealing of the doped region 1105, such as annealing at 600° C. to 1200° C. for a period of time ranging from less than 1 minute to 12 hours. As illustrated in FIG. 12, the annealing of the doped region spreads out the range of the p+ type doped region in a bubble-like fashion 1201.

Figure 13:
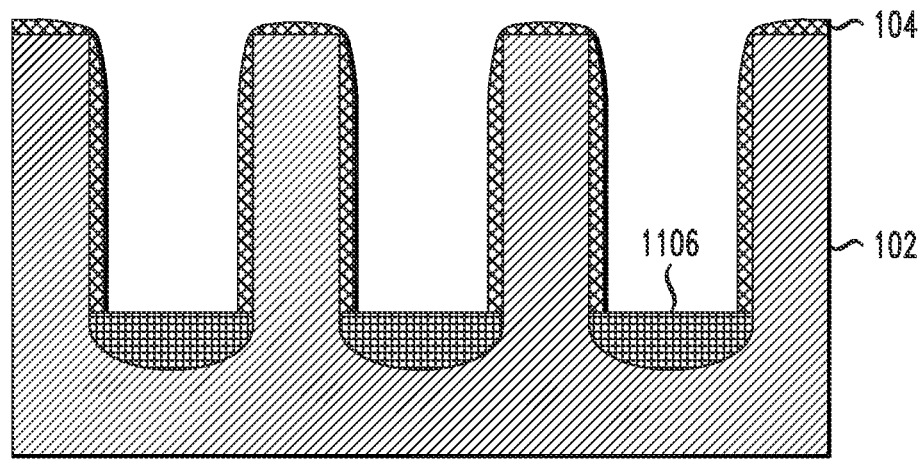
FIG. 13 depicts a side cross-sectional view of the FIG. 12 structure following formation of porous silicon from the doped regions, according to an embodiment of the invention.

FIG. 13 shows a side cross-sectional view 1300 of the FIG. 12 structure following formation of porous silicon 1106 at the base of the trenches 103 from the doped regions 1105. The porous silicon 1106 may be formed via anodic etching, such as using an HF-based anodization etching treatment. The anodization treatment may include etching in a solution of 49% HF for a specific period of time (e.g., 10 s to 20 min, preferably less than 500 s), at a specific current density normalized to the surface area of the trench base (e.g. less than 1 to greater than 10 $mA/cm^2$) while also utilizing surface cleaning treatments e.g., RCA cleaning treatments such as: ammonium hydroxide ($NH_4OH$):hydrogen peroxide ($H_2O_2$):deionized (DI) water in a 1:1:5 ratio at nominally 80° C.).

Figure 14:
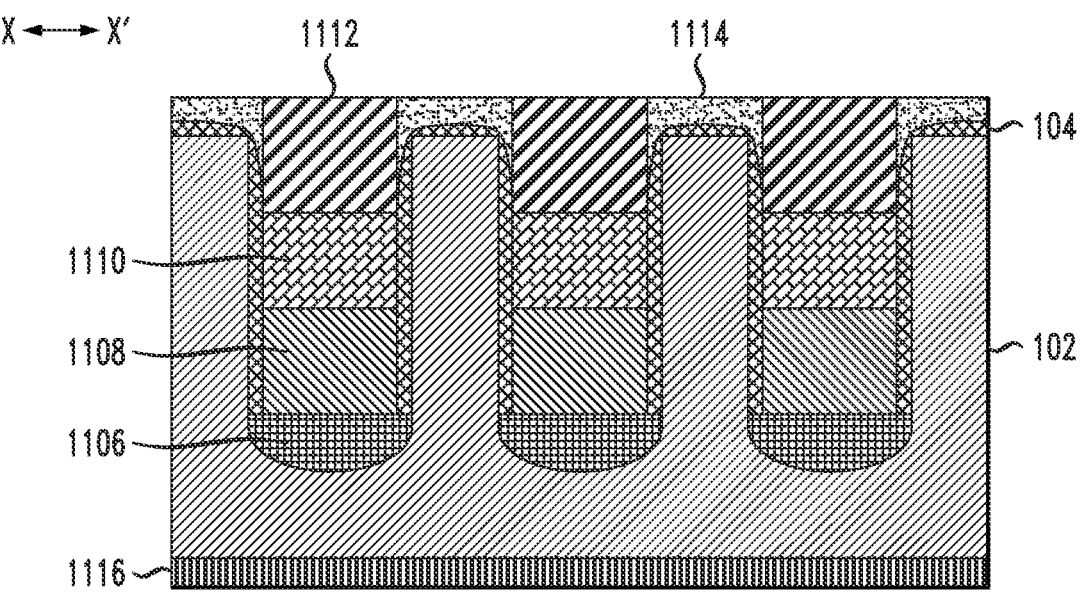
FIG. 14 depicts a side cross-sectional view of the FIG. 13 structure following formation of electrolyte, active cathode electrode, top-side current collector, top-side encapsulation, and bottom-side current collector layers, according to an embodiment of the invention.

FIG. 14 shows a side cross-sectional view 1400 of the FIG. 13 structure, following formation of additional layers for the energy storage device including an electrolyte layer 1108, active electrode or cathode layer 1110, top-side current collectors 1112, encapsulation layer 1114, and bottom-side current collector 1116. The electrolyte layer 1108, active electrode layer 1110, top-side current collectors 1112, encapsulation layer 1114 and bottom-side current collector 1116 may be formed of similar materials, with similar sizing and similar processing as that described above with respect to electrolyte layer 108, active electrode layer 110, top-side current collectors 112, encapsulation layer 114 and bottom-side current collector 116, respectively.

While FIG. 14 shows an example with the bottom-side current collector 1116 blanket formed over the bottom surface of substrate 102, the bottom-side current collector 1116 may in some cases be patterned (e.g., aligned with the base of the trenches 103) in a manner similar to that described above with respect to FIG. 9.

Further, although not shown in FIG. 14, interfacial layers may be formed between the electrolyte layer 1108 and the active electrode layers (e.g., porous silicon layers 1106 acting as the anode and active electrode layer 1110 acting as the cathode) in a manner similar to that described above with respect to interfacial layers 107 and 109 of FIG. 10.

The structure of FIG. 14 may be separated into individual energy storage devices (or groups of structures with one or more of the structures including two or more energy storage devices) through cutting, cleaving, etc. in a manner similar to that described above with respect to FIG. 7. Shadow masks similar to those shown in FIG. 8 may be used for formation of the various components of the energy storage device, although the sizing of the shadow masks may vary.

Figure 15:
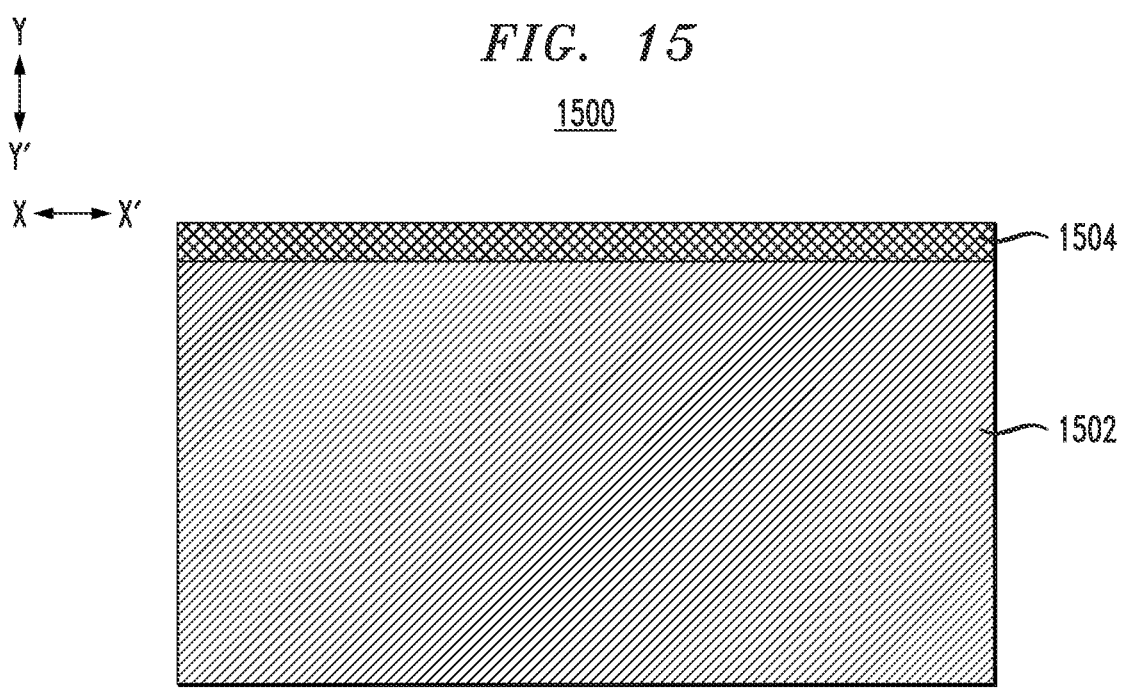
FIG. 15 depicts a side cross-sectional view of a substrate having an electrical and ionic insulating spacer formed over a top surface thereof, according to an embodiment of the invention.
Figure 16:
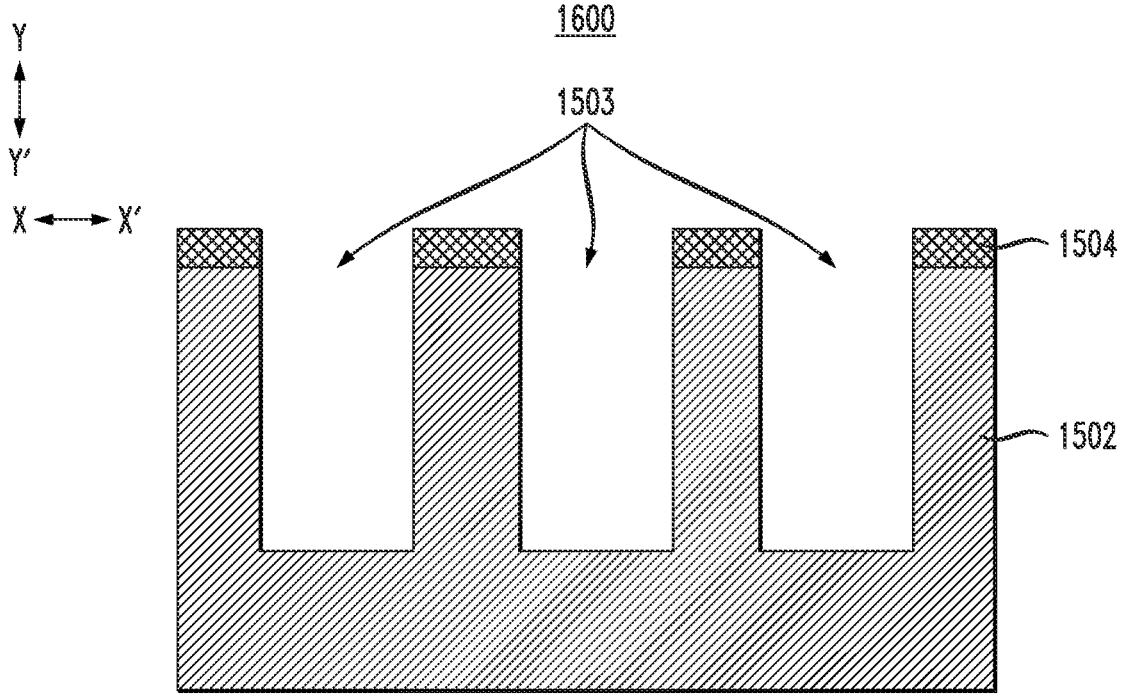
FIG. 16 depicts a side cross-sectional view of the FIG. 15 structure following formation of trenches, according to an embodiment of the invention.
Figure 17:
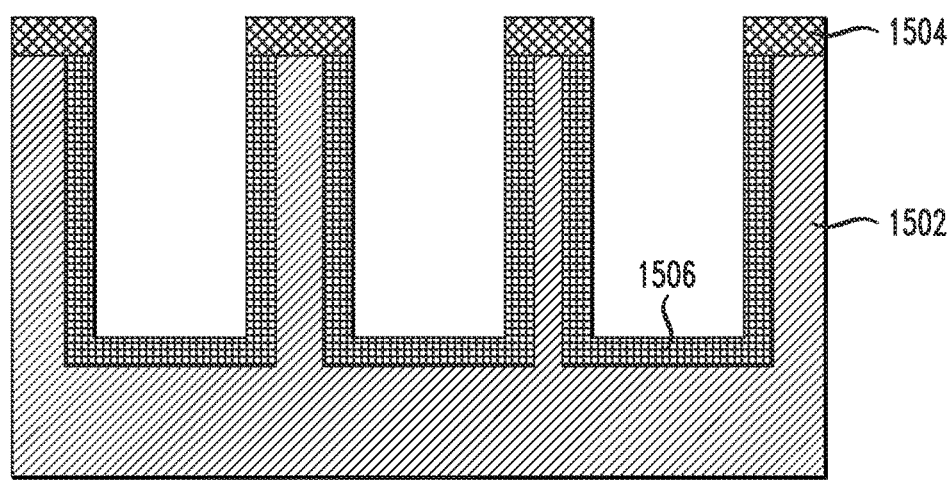
FIG. 17 depicts a side cross-sectional view of the FIG. 16 structure following formation of porous silicon on the sidewalls and base of the trenches, according to an embodiment of the invention.

FIGS. 15-17 illustrate another technique for forming patterned or isolated porous silicon in a non-porous silicon substrate 1502. FIG. 15 shows a side cross-sectional view 1500 of the non-porous silicon substrate 1502, with a blanket deposited dielectric spacer 1504 formed over a top surface thereof (e.g., adhered to a top of the non-porous silicon substrate 1502). The dielectric spacer 1504 may be formed of similar materials as that described above with respect to dielectric spacer 104 (e.g., $Si_3N_4$ or another suitable material or materials). The thickness of the dielectric spacer 1504 may also be similar to that of the dielectric spacer 104.

FIG. 16 shows a side cross-sectional view 1600 of the FIG. 15 structure following formation of trenches 1503 therein. The trenches 1503 may have similar sizing as that of trenches 103 described above. The formation of trenches 1503 may proceed as follows: (1) deposition of a photoresist on top of the dielectric spacer 1504; (2) patterning the photoresist to define the trench locations; (3) etching the dielectric spacer 1504 and non-porous silicon substrate 1502 to form the trenches 1503; and (4) removing the photoresist while leaving the dielectric spacer 1504 on the top surface of the substrate 1502.

One key difference between the structure of FIG. 16 and the structure of FIG. 3 is that the deposition of the dielectric spacer 1504 occurs prior to formation of the 3D trenches 1503 in the FIG. 16 structure while the dielectric spacer 104 is deposited after formation of the 3D trenches 103. A soft or hard mask is employed to protect the dielectric spacer 1504 portions which are desired to remain in the final structure during etching (e.g., utilizing deep RIE or other suitable processing) to form the trenches 1503.

While the structure of the energy storage device trench patterns (e.g., energy storage device containment features) described above include both a sidewall and field dielectric spacer (e.g., spacer 104 is formed on both the sidewalls of the trenches 103 and on the top surface of the substrate 102), the FIG. 16 structure includes only a field dielectric spacer (e.g., spacer 1504 is formed only on the top of the substrate 1502). Additionally, the final patterning of the field dielectric spacer in the FIG. 16 structure occurs once the trenches 1503 are formed from a process such as deep-RIE, where the removal of portions of the field dielectric spacer at the desired positions of the trenches 1503 occurs during trench formation.

The dielectric spacer 1504 may be formed of similar materials and with a similar thickness range as that described above with respect to dielectric spacer 104. The dielectric spacer 1504 in the FIG. 16 structure is formed to control where porous silicon will be formed during later processing described below, and additionally acts as an electrical and ionic insulator for the energy storage device once the components thereof are deposited. Whereas for the structures of FIGS. 6, 9, 10 and 14 it was desired to form porous silicon only at the bases of the trenches 103, for the structure of FIG. 16 it is desired to form porous silicon at the bases as well as the sidewalls of the trenches 1503.

FIG. 17 shows a side cross-sectional view 1700 of the FIG. 16 structure following formation of porous silicon 1506 on the bases and sidewalls of the trenches 1503. The porous silicon 1506 may be formed using processing similar to that described above with respect to FIGS. 4-5 or FIGS. 11-13, although the porous silicon 1506 is formed on the sidewalls and bases of trenches 1503 rather than just the base of the trenches 103 as described above with respect to FIGS. 4-5 and FIGS. 11-13. However, the substrate 1502 is assumed to be p+ doped silicon (whereas the substrate 102 is p−), and thus there is no need to dope the substrate 1502 via ion implantation or epitaxial growth.

Figure 18:
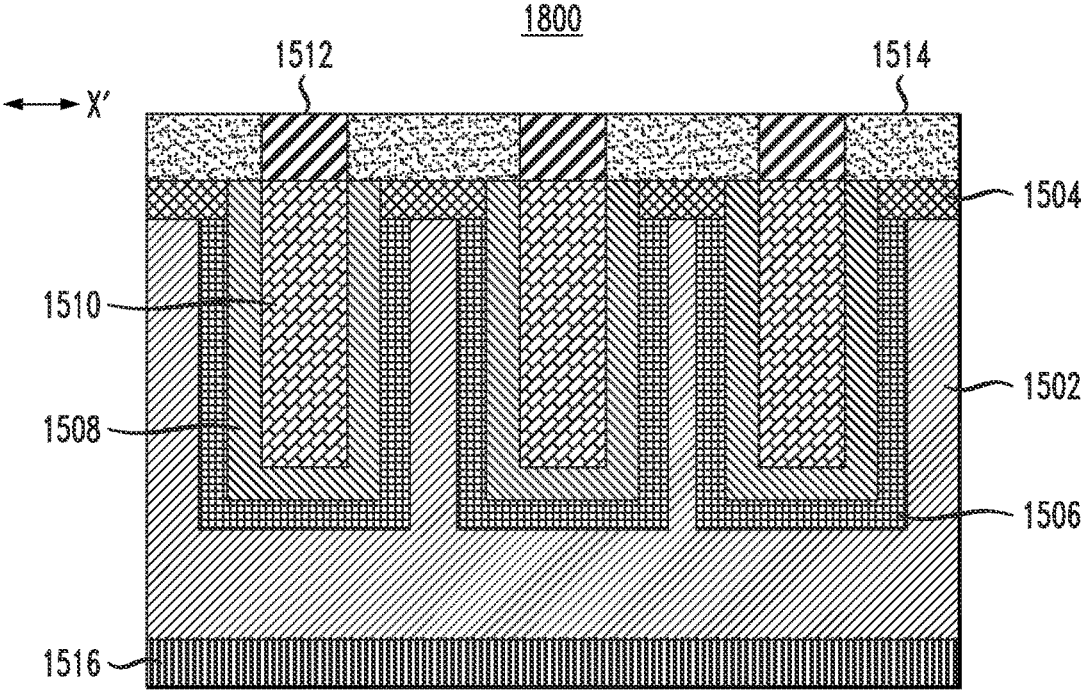
FIG. 18 depicts a side cross-sectional view of the FIG. 17 structure following formation of a three-dimensional patterned electrolyte, three-dimensional patterned active cathode electrode, top-side current collector, top-side encapsulation and bottom-side current collector layers, according to an embodiment of the invention.

FIG. 18 shows a side cross-sectional view 1800 of the FIG. 17 structure following formation of additional layers for the energy storage device, including an electrolyte layer 1508, active electrode or cathode layer 1510, top-side current collectors 1512, encapsulation layer 1514 and bottom-side current collector 1516. The electrolyte layer 1508, active electrode layer 1510, top-side current collectors 1512, encapsulation layer 1514 and bottom-side current collector 1516 may be formed of similar materials and with similar processing as that described above with respect to electrolyte layer 108, active electrode layer 110, top-side current collectors 112, encapsulation layer 114 and bottom-side current collector 116, respectively. The sizing of such components, however, differs as illustrated. The electrolyte layer 1508 is conformally deposited and covers the porous silicon 1506 on the sidewalls and bases of the trenches 1503. The active electrode 1510 fills the remaining space in the trenches 1503. The top-side current collectors 1512 are formed over the active electrode layer 1510. The top-side current collectors 1512 do not cover the electrolyte 1508, as illustrated in FIG. 18. A dielectric separator or spacer may be used to ensure that the top-side current collectors 1512 do not contact the electrolyte 1508. The encapsulation layer 1514 surrounds the top-side current collectors 1512.

The 3D patterned cathode layer 1510 in the FIG. 18 structure enables increased capacity of the energy storage device, as the total surface area of the cathode material can be increased with its 3D structure. Additionally, the 3D patterned cathode layer 1510 can increase the rate of charge transfer between both electrodes, which is a function of the proximity between the cathode and the anode (e.g., porous silicon 1506), the relative thickness of the cathode, and the relative thickness of the electrolyte (e.g., electrolyte layer 1508). In order to control these factors, the complementary three-dimensionality of the cathode and anode materials should be precisely controlled along with the alignment of the cathode to anode and the final proximity of the cathode relative to the anode. In some embodiments, this proximity control is achieved by: (1) applying a known volume of the electrolyte 1508 to the porous silicon 1506-lined trenches 1503, where the electrolyte 1508 has a known viscosity, vapor pressure and hardness; (2) inserting the 3D patterned cathode layer 1510 into the well such that the pressure from the cathode insertion forces the electrolyte 1508 to space-fill all areas between the cathode and anode thereby intimately coating the cathode and anode materials with the electrolyte 1508 while also acting as an electronic barrier between the two active electrodes. Upon curing, hardening, settling, or final processing of the cell, the cathode and anode are spaced apart at fixed dimensions as determined by the final thickness dimensions of the electrolyte 1508.

While FIG. 18 shows an example with the bottom-side current collector 1516 blanket formed over the bottom surface of substrate 1502, the bottom-side current collector 1516 may in some cases be patterned (e.g., aligned with the base of the trenches 1503) in a manner similar to that described above with respect to FIG. 9.

Further, although not shown in FIG. 18, interfacial layers may be formed between the electrolyte layer 1508 and the active electrode layers (e.g., porous silicon layers 1506 acting as the anode and active electrode layer 1510 acting as the cathode) in a manner similar to that described above with respect to interfacial layers 107 and 109 of FIG. 10.

The structure of FIG. 18 may be separated into individual energy storage devices (or groups of structures with one or more of the structures including two or more energy storage devices) through cutting, cleaving, etc. in a manner similar to that described above with respect to FIG. 7. Shadow masks similar to those shown in FIG. 8 may be used for formation of the various components of the energy storage device, although the sizing of the shadow masks may vary.

Figure 19:
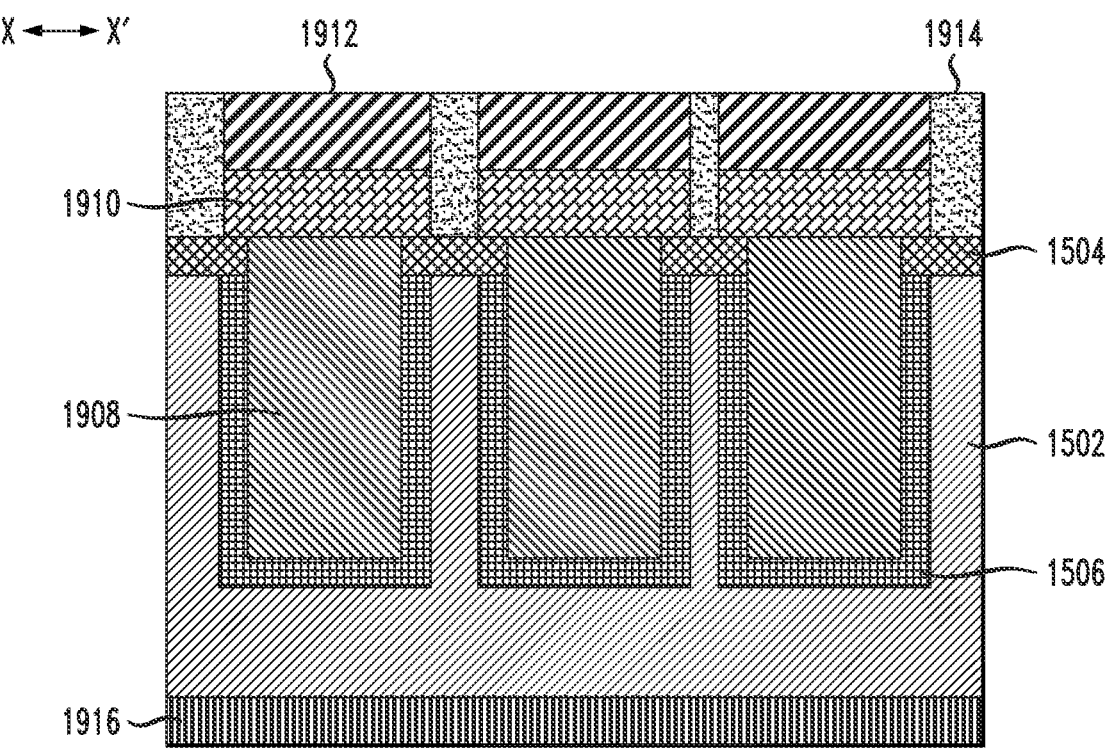
FIG. 19 depicts a side cross-sectional view of the FIG. 17 structure following formation of three-dimensional patterned electrolyte, active cathode electrode, top-side current collector, top-side encapsulation, and bottom-side current collector layers, according to an embodiment of the invention.

FIG. 19 shows a side cross-sectional view of the FIG. 17 structure, following formation of additional layers for the energy storage device, including an electrolyte layer 1908, active electrode or cathode layer 1910, top-side current collectors 1912, encapsulation layer 1914 and bottom-side current collector 1916. The electrolyte layer 1908, active electrode layer 1910, top-side current collectors 1912, encapsulation layer 1914 and bottom-side current collector 1916 may be formed of similar materials and with similar processing as that described above with respect to electrolyte layer 108, active electrode layer 110, top-side current collectors 112, encapsulation layer 114 and bottom-side current collector 116, respectively. The sizing of such components, however, differs as illustrated. The electrolyte layer 1908 covers the porous silicon 1506 and fills the trenches 1503. The active electrode layer 1910 is deposited in a patterned 2D manner on top of the field dielectric spacer 1504 and in intimate contact with the top portion of the electrolyte layer 1908. The top-side current collectors 1912 are deposited using the same patterning scheme as that used for formation of the active electrode layer 1910, followed by formation of encapsulation layer 1914 and bottom-side current collector 1916 using processing similar to that described above.

The 3D patterned electrolyte 1908 of the FIG. 19 structure enables increased charge rate, which is a function of the higher electrochemically accessible surface area of the anode electrode (e.g., porous silicon 1506), as enabled by the 3D filling and deposition of the electrolyte 1908 in the trenches 1503. The possible 2D nature of the cathode (e.g., active electrode 1910) can be controlled in respect to thickness, thereby allowing for faster charge capabilities with thinner cathode materials while also allowing for higher capacity energy storage devices when using thicker cathode materials.

While FIG. 19 shows an example with the bottom-side current collector 1916 blanket formed over the bottom surface of substrate 1502, the bottom-side current collector 1916 may in some cases be patterned (e.g., aligned with the base of the trenches 1503) in a manner similar to that described above with respect to FIG. 9.

Further, although not shown in FIG. 19, interfacial layers may be formed between the electrolyte layer 1908 and the active electrode layers (e.g., porous silicon layers 1506 acting as the anode and active electrode layer 1910 acting as the cathode) in a manner similar to that described above with respect to interfacial layers 107 and 109 of FIG. 10.

The structure of FIG. 19 may be separated into individual energy storage devices (or groups of structures with one or more of the structures including two or more energy storage devices) through cutting, cleaving, etc. in a manner similar to that described above with respect to FIG. 7. Shadow masks similar to those shown in FIG. 8 may be used for formation of the various components of the energy storage device, although the sizing of the shadow masks may vary.

In some embodiments, a method of forming a semiconductor structure comprises forming at least one trench in a non-porous silicon substrate, the at least one trench providing an energy storage device containment feature, forming an electrical and ionic insulating layer disposed over a top surface of the non-porous silicon substrate, and forming, in a base of the at least one trench, a porous silicon layer of unitary construction with the non-porous silicon substrate. The porous silicon layer provides at least a portion of a first active electrode for an energy storage device disposed in the energy storage device containment feature.

The electrical and ionic insulating layer may be further disposed on sidewalls of the at least one trench.

In some embodiments, the non-porous silicon substrate comprises a p− silicon substrate, and forming the porous silicon layer in the base of the at least one trench comprises forming a p+ type doped silicon region with a controlled doping level on an exposed portion of the non-porous silicon substrate in the base of the at least one trench via epitaxial layer growth of p+ type silicon, cleaning the epitaxial layer of p+ type silicon, and electrochemically etching the cleaned epitaxial layer to form the porous silicon layer. Cleaning the epitaxial layer of p+ type silicon may utilize a solution of ammonium hydroxide:hydrogen peroxide:deionized water at a ratio of 1:1:5, and electrochemically etching the cleaned epitaxial layer to form the porous silicon layer may comprise electrochemically etching the cleaned epitaxial layer in hydrofluoric acid.

In other embodiments, the non-porous silicon substrate comprises a p− type silicon substrate, and forming the porous silicon layer in the base of the at least one trench comprises forming a p+ type doped silicon region on an exposed portion of the non-porous p− type silicon substrate in the base of the at least one trench, cleaning the p+ type doped silicon region, and electrochemically etching the cleaned p+ type doped silicon region to form the porous silicon layer. Forming the p+ type doped silicon region may comprise utilizing Boron ion implantation followed by annealing, cleaning the p+ type doped silicon region may utilize a solution of ammonium hydroxide:hydrogen peroxide:deionized water at a ratio of 1:1:5, and electrochemically etching the cleaned p+ type doped silicon region to form the porous silicon layer may comprise electrochemically etching the cleaned p+ type doped silicon region in hydrofluoric acid.

In some embodiments, the method further comprises forming an electrolyte layer disposed over the porous silicon layer, forming a second active electrode layer for the energy storage device disposed over the electrolyte layer, forming a first current collector disposed over the second active electrode layer, forming an encapsulation layer disposed over the electrical and ionic insulating layer surrounding the first current collector, and forming a second current collector on a bottom surface of the non-porous silicon substrate. The method may further comprise forming a first interfacial layer disposed between the non-porous silicon layer and the electrolyte layer, and forming a second interfacial layer disposed between the electrolyte layer and the second active electrode layer.

In some embodiments, forming the electrical and ionic insulating layer comprises blanket depositing an electrically and ionically insulating material over a top surface of the non-porous silicon substrate prior to forming the at least one trench; forming the at least one trench in the non-porous silicon substrate comprises patterning a resist material over the electrically and ionically insulating material, etching exposed portions of the electrically and ionically insulating material and underlying portions of the non-porous silicon substrate to form the at least one trench, and removing remaining portions of the resist material; and forming the porous silicon layer comprises forming the porous silicon layer in the base and sidewalls of the at least one trench. The non-porous silicon substrate may comprise a p+ type silicon substrate, and forming the porous silicon layer may comprise cleaning exposed p+ type silicon substrate on sidewalls and bases of the at least one trench and electrochemically etching the cleaned exposed p+ type silicon on sidewalls and bases of the at least one trench to form the porous silicon layer.

In some embodiments, the method further comprises forming an electrolyte layer disposed over the porous silicon layer on the sidewalls and bases of the at least one trench, forming a second active electrode layer for the energy storage device in a remaining space of the at least one trench between portions of the electrolyte layer, forming a first current collector disposed over the second active electrode layer, forming an encapsulation layer disposed over the electrical and ionic insulating layer surrounding the first current collector, and forming a second current collector on a bottom surface of the non-porous silicon substrate.

In other embodiments, the method further comprises forming an electrolyte layer conforming to the porous silicon layer on the sidewalls and bases of the at least one trench, forming a second active electrode layer conforming to the electrolyte layer for the energy storage device, wherein the electrolyte layer fills a region between the second active electrode layer and the porous silicon on the sidewalls and base of the at least one trench, forming a first current collector disposed over the second active electrode layer, forming an encapsulation layer disposed over the electrical and ionic insulating layer surrounding sidewalls of the first current collector, and forming a second current collector on a bottom surface of the non-porous silicon substrate.

In some embodiments, a semiconductor structure comprises a non-porous silicon substrate having at least one trench disposed therein, the at least one trench providing an energy storage device containment feature, an electrical and ionic insulating layer disposed over a top surface of the non-porous silicon substrate, and a porous silicon layer of unitary construction with the non-porous silicon substrate disposed in a base of the at least one trench. The porous silicon layer provides at least a portion of a first active electrode for an energy storage device disposed in the energy storage device containment feature.

The electrical and ionic insulating layer may be further disposed on sidewalls of the at least one trench. In some embodiments, the non-porous silicon substrate comprises a p− type silicon substrate, and the porous silicon layer comprises an epitaxially grown p+ type silicon electrochemically etched in hydrofluoric acid. In other embodiments, the non-porous silicon substrate comprises a p− type silicon substrate, and the porous silicon layer comprises a p+ type doped region electrochemically etched in hydrofluoric acid.

The semiconductor structure may further comprise an electrolyte layer disposed over the porous silicon layer, a second active electrode layer for the energy storage device disposed over the electrolyte layer, a first current collector disposed over the second active electrode layer, an encapsulation layer disposed over the electrical and ionic insulating layer surrounding the first current collector, and a second current collector on a bottom surface of the non-porous silicon substrate.

In some embodiments, the semiconductor structure further comprises an electrolyte layer disposed over the porous silicon layer on the sidewalls and bases of the at least one trench, a second active electrode layer for the energy storage device in a remaining space of the at least one trench between portions of the electrolyte layer, a first current collector disposed over the second active electrode layer, an encapsulation layer disposed over the electrical and ionic insulating layer surrounding the first current collector, and a second current collector on a bottom surface of the non-porous silicon substrate.

In other embodiments, the semiconductor structure further comprises an electrolyte layer disposed over the non-porous silicon layer on the sidewalls and bases of the at least one trench, the electrolyte layer filling the at least one trench, a second active electrode layer for the energy storage device disposed over the electrolyte layer, a first current collector disposed over the second active electrode layer, an encapsulation layer disposed over the electrical and ionic insulating layer surrounding the first current collector, and a second current collector on a bottom surface of the non-porous silicon substrate.

In some embodiments, an integrated circuit comprises an energy storage device comprising a non-porous silicon substrate having at least one trench disposed therein, the at least one trench providing an energy storage device containment feature for the energy storage device, an electrical and ionic insulating layer disposed over a top surface of the non-porous silicon substrate, a porous silicon layer of unitary construction with the non-porous silicon substrate disposed in a base of the at least one trench, wherein the porous silicon layer provides at least a portion of a first active electrode for the energy storage device disposed in the energy storage device containment feature, an electrolyte layer disposed over the porous silicon layer, and a second active electrode layer disposed over the electrolyte layer.

It is to be appreciated that the various materials, processing methods (e.g., etch types, deposition types, etc.) and dimensions provided in the discussion above are presented by way of example only. Various other suitable materials, processing methods, and dimensions may be used as desired.

Semiconductor devices and methods for forming same in accordance with the above-described techniques can be employed in various applications, hardware, and/or electronic systems. Suitable hardware and systems for implementing embodiments of the invention may include, but are not limited to, sensors and sensing devices, personal computers, communication networks, electronic commerce systems, portable communications devices (e.g., cell and smart phones), solid-state media storage devices, functional circuitry, etc. Systems and hardware incorporating the semiconductor devices are contemplated embodiments of the invention. Given the teachings provided herein, one of ordinary skill in the art will be able to contemplate other implementations and applications of embodiments of the invention.

Various structures described above may be implemented in integrated circuits. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of forming a semiconductor structure, comprising:
   forming at least one trench in a non-porous silicon substrate, the at least one trench providing an energy storage device containment feature;
   forming an electrical and ionic insulating layer disposed over a top surface of the non-porous silicon substrate;
   forming, in a base of the at least one trench, a porous silicon layer of unitary construction with the non-porous silicon substrate;
   forming a bottom current collector on at least a portion of a bottom surface of the non-porous silicon substrate, the portion of the bottom surface of the non-porous silicon substrate being aligned with the base of the at least one trench in which the porous silicon layer is formed, the bottom current collector being separated from the porous silicon layer by a non-porous silicon material of the non-porous silicon substrate;

wherein the porous silicon layer provides at least a portion of a first active electrode for an energy storage device disposed in the energy storage device containment feature;

wherein the electrical and ionic insulating layer is further disposed on sidewalls of the at least one trench;

wherein the non-porous silicon substrate comprises a p−silicon substrate, and wherein forming the porous silicon layer in the base of the at least one trench comprises:

forming a p+ type doped silicon region with a controlled doping level on an exposed portion of the non-porous silicon substrate in the base of the at least one trench via epitaxial layer growth of p+ type silicon;

cleaning the epitaxial layer of p+ type silicon; and electrochemically etching the cleaned epitaxial layer to form the porous silicon layer;

wherein cleaning the epitaxial layer of p+ type silicon utilizes a solution of ammonium hydroxide:hydrogen peroxide:deionized water at a ratio of 1:1:5; and wherein electrochemically etching the cleaned epitaxial layer to form the porous silicon layer comprises electrochemically etching the cleaned epitaxial layer in hydrofluoric acid.

2. The method of claim 1, further comprising:

forming an electrolyte layer disposed over the porous silicon layer;

forming a second active electrode layer for the energy storage device containment feature disposed over the electrolyte layer;

forming a top current collector disposed over the second active electrode layer; and forming an encapsulation layer disposed over the electrical and ionic insulating layer surrounding the top current collector.

3. The method of claim 2, further comprising:

forming a first interfacial layer disposed between the porous silicon layer and the electrolyte layer; and forming a second interfacial layer disposed between the electrolyte layer and the second active electrode layer.

4. The method of claim 1, wherein:

forming the electrical and ionic insulating layer comprises blanket depositing an electrically and ionically insulating material over a top surface of the non-porous silicon substrate prior to forming the at least one trench;

forming the at least one trench in the non-porous silicon substrate comprises:

patterning a resist material over the electrically and ionically insulating material;

etching exposed portions of the electrically and ionically insulating material and underlying portions of the non-porous silicon substrate to form the at least one trench; and removing remaining portions of the resist material; and forming the porous silicon layer comprises forming the porous silicon layer in the base and sidewalls of the at least one trench.

5. The method of claim 4, further comprising:

forming an electrolyte layer disposed over the porous silicon layer on the sidewalls and bases of the at least one trench;

forming a second active electrode layer for the energy storage device in a remaining space of the at least one trench between portions of the electrolyte layer;

forming a top current collector disposed over the second active electrode layer;

forming an encapsulation layer disposed over the electrical and ionic insulating layer surrounding the top current collector.

6. The method of claim 1, wherein electrochemically etching the cleaned epitaxial layer in hydrofluoric acid comprises utilizing a hydrofluoric acid-based anodization etching treatment.

7. The method of claim 6, wherein the hydrofluoric acid-based anodization etching treatment comprises etching in a solution of hydrofluoric acid for a designated period of time.

8. The method of claim 7, wherein the solution of hydrofluoric acid comprises about 49% hydrofluoric acid.

9. The method of claim 7, wherein the designated period of time is between about 10 seconds and about 20 minutes.

10. The method of claim 7, wherein the designated period of time is less than about 500 seconds.

11. The method of claim 7, wherein the hydrofluoric acid-based anodization etching treatment comprises etching in a solution of hydrofluoric acid for the designated period of time at a specific current density normalized to a surface area of the base of the at least one trench.

12. The method of claim 11, wherein the specific current density is less than 1 to greater than 10 milliamperes per square centimeter.

13. The method of claim 1, wherein the controlled doping level of the p+ type doped silicon region comprises a Boron doping in the range of about $10^{18}/cm^3$ to greater than $10^{20}/cm^3$.

14. The method of claim 1, wherein the controlled doping level of the p+ type doped silicon region comprises a Boron doping in the range of about 1 to $3^{19}/cm^3$.

15. The method of claim 2, wherein the electrolyte layer comprises a material that is ionically conducting to lithium.

16. The method of claim 2, wherein the second active electrode layer comprises a lithium-containing material.

17. The method of claim 2, wherein each of the top current collector and the bottom current collector comprises at least one of copper, nickel, aluminum, titanium, tungsten, platinum, and gold.

18. The method of claim 2, wherein the encapsulation layer comprises silicon nitride.

19. The method of claim 3, wherein the first interfacial layer comprises at least one of lithium metal, molten lithium metal and a lithiated active planar anode layer.

20. The method of claim 3, wherein the second interfacial layer comprises at least one of lithium phosphorus oxygen, aluminum oxide, lithium niobium oxide, gold, indium and a lithium silicon composite.

* * * * *